United States Patent
Shirono et al.

(10) Patent No.: US 8,080,209 B2
(45) Date of Patent: Dec. 20, 2011

(54) EXHAUST GAS TREATMENT APPARATUS

(75) Inventors: Katsuhiro Shirono, Kitakyushu (JP); Tsuguo Koyanagi, Kitakyushu (JP)

(73) Assignee: JGC Catalysts and Chemicals Ltd., Kawasaki-shi (JP)

( * ) Notice: Subject to any disclaimer, the term of this patent is extended or adjusted under 35 U.S.C. 154(b) by 355 days.

(21) Appl. No.: 12/391,813

(22) Filed: Feb. 24, 2009

(65) Prior Publication Data

US 2009/0214397 A1    Aug. 27, 2009

(30) Foreign Application Priority Data

Feb. 25, 2008 (JP) ................................. 2008-043281
Mar. 11, 2008 (JP) ................................. 2008-061502

(51) Int. Cl.
*B01D 50/00* (2006.01)
(52) U.S. Cl. ....................................................... 422/177
(58) Field of Classification Search .................. 422/168, 422/177, 180
See application file for complete search history.

(56) References Cited

U.S. PATENT DOCUMENTS

| | | | |
|---|---|---|---|
| 6,762,143 B2 | 7/2004 | Shan et al. | |
| 7,509,799 B2 | 3/2009 | Amou et al. | |
| 2007/0259770 A1* | 11/2007 | Hofmann et al. | 502/60 |

FOREIGN PATENT DOCUMENTS

| | | |
|---|---|---|
| DE | 19734627 C1 | 1/1999 |
| EP | 0487886 A1 | 6/1992 |
| EP | 0555746 A1 | 8/1993 |
| EP | 0615777 A1 | 9/1994 |
| EP | 1481719 A2 | 12/2004 |
| EP | 2045369 A1 | 4/2009 |
| JP | 2001027112 A * | 1/2001 |
| JP | 2002089241 A | 3/2002 |
| JP | 2002121697 A | 4/2002 |
| JP | 2004238209 A | 8/2004 |
| JP | 2005273509 A | 10/2005 |
| JP | 2005288397 A | 10/2005 |
| JP | 2005344597 A | 12/2005 |
| JP | 2007229544 A | 9/2007 |
| JP | 2007332451 A | 12/2007 |
| WO | 0117901 A1 | 3/2001 |
| WO | 2005025725 A1 | 3/2005 |
| WO | 2008089956 A2 | 7/2008 |

OTHER PUBLICATIONS

Steinbach, Sebastian et al., "Characterisation of structured hydrolysis catalysts for urea-SCR", Topics in Catalysts, May 2007, pp. 99-103, vols. 42-43, Springer Science+Business Media, LLC.

* cited by examiner

*Primary Examiner* — Tom Duong
(74) *Attorney, Agent, or Firm* — The Webb Law Firm

(57) ABSTRACT

An exhaust gas treatment apparatus includes a device (A) which is provided in an exhaust system and which selectively reduces $NO_x$ in an exhaust gas and a device (B) which is disposed upstream of the device (A) and which decomposes urea and supplies ammonia as a $NO_x$ reducing gas, the device (B) including a urea decomposition catalyst. The catalyst is [1] a zeolite catalyst which is composed of granular molded bodies including zeolite particles or which includes a catalyst layer composed of zeolite particles disposed on a support, or [2] a honeycomb catalyst or a membranous catalyst in which metal oxide particulates adhere to a conductive honeycomb substrate or netlike support, and the metal oxide particulates are composed of at least one oxide of a metal selected from the group consisting of Na, Mg, Ca, Ba, La, Ce, Ti, Zr, V, Cr, Mo, W, Mn, Zn, Al, Si, P, Sb, Cu, Fe, Ru, Co, and Re.

16 Claims, 1 Drawing Sheet

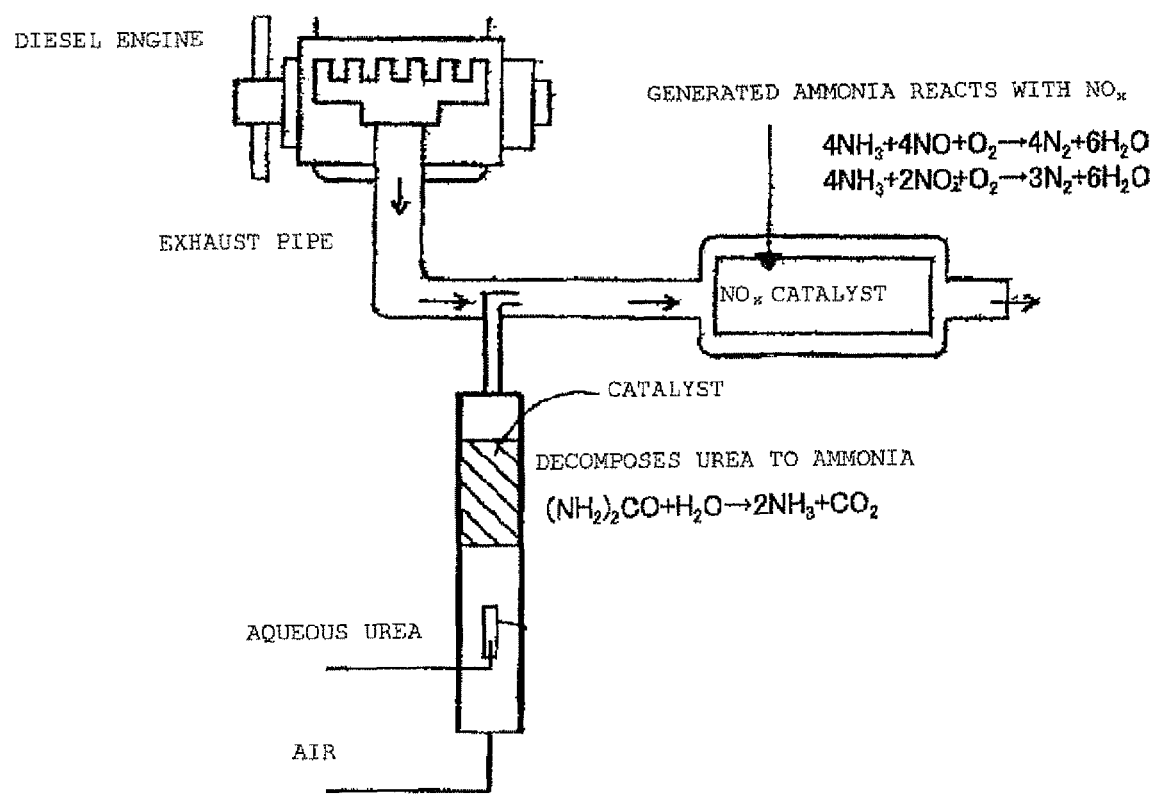

EXHAUST GAS TREATMENT APPARATUS

BACKGROUND OF THE INVENTION

1. Field of the Invention

The present invention relates to an exhaust gas treatment apparatus for treating exhaust gases from internal combustion engines in which exhaust gas treatment efficiency is enhanced.

2. Description of the Related Art

Exhaust gases discharged from diesel engines contain pollutants, such as HC (hydrocarbons), CO (carbon monoxide), $NO_x$ (nitrogen oxides), and PM (particulate matter). Among these pollutants, $NO_x$ is difficult to purify using oxidation catalysts or three-way catalysts which are practically used for gasoline-fueled automobiles. As promising catalysts capable of purifying $NO_x$, selective reduction type $NO_x$ catalysts (hereinafter referred to as "SCR catalysts") are under development.

Examples of known SCR catalysts include catalysts which have a honeycomb structure including an active component, such as V, Cr, Mo, Mn, Fe, Ni, Cu, Ag, Au, Pd, Y, Ce, Nd, W, In, or Ir, carried on a carrier composed of $TiO_2$, a binary oxide, such as $SiO_2$—$TiO_2$, $WO_3$—$TiO_2$, or $SiO_2$—$TiO_2$, or a ternary oxide, such as $WO_3$—$SiO_2$—$TiO_2$ or $MoO_3$—$SiO_2$—$TiO_2$, and in which $NO_x$ is reduced, in the presence of a reductant, such as ammonia, into nitrogen gas to perform purification.

$$4NO+4NH_3+O_2 \rightarrow 4N_2+6H_2O \quad (1)$$

$$NO+NO_2+2NH_3 \rightarrow 2N_2+3H_2O \quad (2)$$

$$6NO_2+8NH_3 \rightarrow 7N_2+12H_2O \quad (3)$$

In addition, a catalyst in which a support layer composed of particulates having catalytic activity, such as zeolite, is disposed on a monolith carrier is also known.

As the method of supplying ammonia as a reductant, a method is known in which urea is added from an aqueous urea tank to an exhaust system at a location upstream from an SCR catalyst thereby to generate ammonia. Urea is hydrolyzed by heat of exhaust gas or by a hydrolysis catalyst to generate ammonia. However, thermal decomposition of urea by heat of exhaust gas may generate high-melting-point materials, such as cyanuric acid, isocyanic acid, and melamine, resulting in a decrease in decomposition efficiency or a decrease in $NO_x$ reducing performance at the downstream location. Furthermore, these materials are known to be toxic.

Japanese Unexamined Patent Application Publication No. 2005-344597 (Patent Document 1) proposes that aqueous urea is vaporized for feeding, the fed urea is hydrolyzed to ammonia by a honeycomb, plate-shaped, or granular catalyst, and the resulting ammonia is used.

A method is also disclosed in which stored water is fed, under heating, to a cartridge in which urea in the solid state together with zeolite is stored, and urea is hydrolyzed to ammonia to be supplied (Japanese Unexamined Patent Application Publication No. 2002-89241, Patent Document 2).

Furthermore, a method is disclosed in which using a metal complex resin or urease enzyme as a catalyst, at a reaction temperature of 70° C. or lower, urea is converted to ammonium carbonate which is highly soluble in water and generates ammonia at a relatively low temperature, the resulting ammonium carbonate being used (Japanese Unexamined Patent Application Publication No. 2005-273509, Patent Document 3).

However, although generation of high-melting-point materials can be suppressed, when such a complex catalyst or enzyme catalyst is used even in the form of blocks, the catalyst is disintegrated into powder as operating time passes, which may result in clogging of pipes, and also the catalytic performance gradually degrades, which makes longtime stable use impossible.

On the other hand, many metal oxides have been used as heterogeneous catalysts, and used at high space velocity (SV) depending on the type of reaction. In such a case, in fixed bed reaction, most of the catalysts are used as molded bodies, such as granular, pellet-shaped, or honeycomb bodies. In the case where a catalyst is used in the form of granular or pellet-shaped molded bodies, when the size of the catalyst is small, the activity is relatively high, but a differential pressure may occur, for example, at high SV, resulting in difficulty in operation. When the size of the catalyst of the granular, pellet-shaped is large or the catalyst is honeycomb-shaped, the effectiveness factor decreases, resulting in insufficient performance. This necessitates an increase in the amount of the catalyst, use of a large reaction tower, or the like. In either case, disintegration into powder occurs when the catalyst is filled in or taken out of a reactor or the like, which is a problem. Therefore, there has been a requirement for molded bodies which are excellent in terms of strength, abrasion resistance, etc.

With respect to such granular or pellet-shaped molded bodies, for example, a catalyst component is kneaded and subjected to extrusion molding, and the extrusion-molded material is cut into an appropriate length thereby to obtain pellet-shaped molded bodies. Before drying, the pellet-shaped molded bodies are granulated with a Marumerizer or the like to thereby obtain granular molded bodies.

Furthermore, in order to obtain honeycomb molded bodies, for example, a catalyst component is kneaded and subjected to extrusion-molding using multi-hole dies. However, distortion and deflection may occur, and cracks are easily generated during drying and firing, giving rise to a productivity problem. For this reason, it is difficult to obtain large honeycomb molded bodies. Another method is known in which a catalyst layer is formed on the surface of a honeycomb substrate composed of metal or ceramic. However, in this method, adhesion to the substrate is not very good.

In recent years, as in the case of fuel cells and the like, incorporation of a system including a reaction system into an apparatus has been under study. In such a case, in order to reduce the size of the apparatus and enhance the performance of the apparatus, membrane reactors have been actively developed.

For example, a fluorocarbon resin-containing porous body for a gas diffusion electrode has been disclosed in which a dispersion liquid, as a gas diffusion electrode material, containing fluorocarbon resin particulates, carbon black particulates, and as necessary, metal particulates selected from gold, silver, and platinum metals, and alloys of these metals, or metal oxide particulates thereof, is prepared, the pH of the dispersion liquid is adjusted, the zeta potential of the particulates is adjusted by addition of an ionically dissociative compound, and the gas diffusion electrode material is deposited on the surface of a conductive substrate, such as a wire gauze, by electrophoresis. That is, deposition of particulates on a conductive substrate by electrophoresis has been disclosed (refer to Japanese Unexamined Patent Application Publication No. 2002-121697, Patent Document 4).

SUMMARY OF THE INVENTION

However, in the conventionally proposed method, application is limited, adhesion of the particulate layer to the substrate, abrasion resistance, strength, etc. are insufficient, and it is difficult to use the resulting gas diffusion electrode directly for high-temperature catalytic reaction, adsorption, separation, etc.

The present inventors have diligently conducted research in order to solve the problems described above. As a result, it has been found that, when a catalyst is prepared by immersing a stainless steel honeycomb substrate in a metal oxide particulate dispersion liquid containing a peroxy compound or a fibrous material and electrodepositing metal oxide particulates on the surface of the honeycomb substrate to form a metal oxide particulate layer, the catalyst is excellent in terms of adhesion to the substrate, abrasion resistance, strength, etc., and when the catalyst is used for hydrolysis of urea, generation of a high-melting-point material can be suppressed, urea can be efficiently decomposed, and it is possible to stably supply ammonia without clogging of pipes or the like. Thereby, the present invention has been completed.

That is, it is an object of the present invention to provide an exhaust gas treatment apparatus in which the possibility of clogging of pipes is eliminated and a reductant is generated promptly and stably so as to enhance reliability of exhaust gas purification performance and exhaust gas purification efficiency.

As a result of diligent research in order to solve the problems described above, it has been found that all of the problems described above can be solved by using the specific granular molded bodies or zeorite catalyst as a catalyst for hydrolysis of urea. Thereby, the present invention has been completed.

The present invention has the following structure:

[1] An exhaust gas treatment apparatus including a device (A) which is provided in an exhaust system and which selectively reduces $NO_x$ in an exhaust gas and a device (B) which is disposed upstream of the device (A) and which decomposes urea and supplies ammonia as a $NO_x$ reducing gas, wherein the device (B) includes a urea decomposition catalyst, and the urea decomposition catalyst is a zeolite catalyst which is composed of granular molded bodies including zeolite particles or which includes a catalyst layer composed of a support and zeolite particles disposed on the support.

[2] The exhaust gas treatment apparatus according to item [1], wherein a zeolite used in the zeolite catalyst is at least one selected from ZSM-5-type zeolite, mordenite-type zeolite, faujasite-type zeolite, A-type zeolite, L-type zeolite, and β zeolite.

[3] The exhaust gas treatment apparatus according to item [1] or [2], wherein the average particle diameter of the zeolite particles is in a range of 0.01 to 10 µm.

[4] An exhaust gas treatment apparatus including a device (A) which is provided in an exhaust system and which selectively reduces $NO_x$ in an exhaust gas and a device (B) which is disposed upstream of the device (A) and which decomposes urea and supplies ammonia as a $NO_x$ reducing gas, wherein the device (B) includes a urea decomposition catalyst, the urea decomposition catalyst is a honeycomb catalyst or a membranous catalyst in which metal oxide particulates adhere to a conductive honeycomb substrate or netlike support, and the metal oxide particulates are composed of at least one oxide of a metal selected from the group consisting of Na, Mg, Ca, Ba, La, Ce, Ti, Zr, V, Cr, Mo, W, Mn, Zn, Al, Si, P, Sb, Cu, Fe, Ru, Co, and Re.

[5] The exhaust gas treatment apparatus according to item [4], wherein the metal oxide particulates are composed of at least one selected from $SiO_2$, $Al_2O_3$, $TiO_2$, $ZrO_2$, NiO, $Fe_2O_3$, CoO, $RuO_2$, CuO, $Re_2O_3$, $WO_3$, $V_2O_5$, $Nb_2O_5$, and $MnO_2$.

[6] The exhaust gas treatment apparatus according to item [4] or [5], wherein the average particle diameter of the metal oxide particulates is in a range of 10 nm to 10 µm.

[7] The exhaust gas treatment apparatus according to any one of items [1] to [6], wherein the urea decomposition catalyst further includes, together with the zeolite particles or the metal oxide particulates, a fibrous material having a length (L) of 50 nm to 10 µm, a diameter (D) of 10 nm to 2 µm, and an aspect ratio (L)/(D) of 5 to 1,000.

[8] The exhaust gas treatment apparatus according to any one of items [1] to [7], wherein the urea decomposition catalyst further includes, together with the zeolite particles or the metal oxide particulates, colloid particles having an average particle diameter in a range of 2 to 300 nm.

[9] The exhaust gas treatment apparatus according to any one of items [1] to [8], wherein the urea decomposition catalyst further includes, together with the zeolite particles or the metal oxide particulates, an inorganic oxide derived from a peroxo compound.

[10] The exhaust gas treatment apparatus according to any one of items [1] to [9], wherein the urea decomposition catalyst is formed by an electrodeposition process.

[11] The exhaust gas treatment apparatus according to any one of items [1] to [10], wherein the reaction temperature during the decomposition of the urea is in a range of 90° C. to 250° C.

According to the present invention, since a specific catalyst or the like is used as the catalyst for hydrolysis of urea, it is possible to provide an exhaust gas treatment apparatus in which generation of a high-melting-point material, such as cyanuric acid, can be suppressed, urea can be selectively hydrolyzed to ammonia, and $NO_x$ in an exhaust gas can be selectively reduced stably.

In particular, in a honeycomb molded body or a membranous molded body obtained by immersing a honeycomb substrate composed of metal or a netlike support composed of metal in a zeolite dispersion liquid containing a perox compound or a metal oxide particulate dispersion liquid containing a peroxo compound, and depositing zeolite particles or metal oxide particulates on the substrate by an electrodeposition process, a relatively small molded body can be manufactured inexpensively, and the urea hydrolysis activity is high. Consequently, the operation can be performed at relatively low temperatures, and urea can be selectively hydrolyzed to ammonia without generating a high-melting-point material, such as cyanuric acid, and it is possible to provide an exhaust gas treatment apparatus which can selectively reduce and remove $NO_x$ in an exhaust gas.

BRIEF DESCRIPTION OF THE DRAWING

The drawing schematically depicts an exhaust gas treatment apparatus according to an embodiment of the present invention.

DESCRIPTION OF THE PREFERRED EMBODIMENTS

An exhaust gas treatment apparatus according to the present invention will be described in detail below. An exhaust gas treatment apparatus according to the present invention includes a device (A) which is provided in an exhaust system and which selectively reduces $NO_x$ in an exhaust gas and a device (B) which is disposed upstream of the device (A) and which decomposes urea and supplies ammonia as a $NO_x$ reducing gas. The device (B) includes a urea decomposition catalyst, and the urea decomposition catalyst is a zeolite catalyst (a first embodiment of the present invention) or a honeycomb catalyst or a membranous catalyst composed of metal oxide particulates (a second embodiment of the present invention).

FIG. 1 shows an exhaust gas treatment apparatus according to an embodiment of the present invention. As shown in FIG. 1, the exhaust gas treatment apparatus includes a selective reduction device and a device which is disposed upstream of the selective reduction device and which decomposes urea by means of a certain urea decomposition catalyst and supplies ammonia as a $NO_x$ reducing gas.

First Embodiment

Zeolite Catalyst

In the first embodiment, a zeolite catalyst is used as the urea decomposition catalyst.
Zeolite As the zeolite used in the zeolite catalyst, a known synthetic zeolite or natural zeolite can be used. Zeolites are usually crystalline aluminosilicates in the narrow sense, but are not limited thereto. A crystalline aluminosilicate phosphate (SAPO), crystalline aluminophosphate (ALPO), crystalline titanosilicate (TS), or the like can also be used.

The zeolite used in the present invention is preferably at least one selected from ZSM-5-type zeolite, mordenite-type zeolite, faujasite-type zeolite, A-type zeolite, L-type zeolite, and β zeolite. These zeolites have excellent urea decomposition activity.

The average particle diameter of the zeolite particles is preferably in a range of 0.01 to 10 μm, and more preferably in a range of 0.02 to 5 μm. It is difficult to obtain a zeolite having an average particle diameter lower than the range described above, and even if it can be obtained, crystallinity is low, and in some cases, sufficient performance may not be obtained. Even if the average particle diameter is increased, it is difficult to obtain a catalyst for molding, which is described below. For example, deposition onto a conductive substrate may be insufficient, and even if deposition is performed, adhesion to the substrate may be insufficient, or the density, strength, abrasion resistance, etc. of the resulting thin film may be insufficient.

Furthermore, as the zeolite, a known zeolite ion-exchanged with metal ions of various types or a zeolite carrying a metal may be used.
Shape In the zeolite catalyst used in the present invention, a catalyst layer composed of zeolite particles is disposed on a support. In particular, preferably, a catalyst layer composed of zeolite particles is disposed on a honeycomb substrate or a netlike support as the support, or the zeolite catalyst is composed of granular molded bodies including zeolite particles.
(1) Zeolite Catalyst in which Catalyst Layer is Disposed A zeolite catalyst according to an embodiment includes a honeycomb substrate or a netlike support and a zeolite catalyst layer disposed on the surface thereof.
Honeycomb Substrate As the honeycomb substrate, a honeycomb substrate composed of metal is used. Examples of the metal constituting the honeycomb substrate include aluminum, tin, and various types of stainless steel.

Preferably, the honeycomb substrate has a cross section having an outer diameter in a range of 10 to 200 mm an opening in a range of 1 to 30 mm, a wall thickness in a range of 0.01 to 5 mm, and a length in a range of 20 to 1,000 mm.

If the outer diameter is excessively small, it is necessary to increase the number of honeycomb catalysts. Basically, use of a large honeycomb catalyst is effective and economical. If the outer diameter is excessively large, in some cases, the metal oxide particulate layer may be formed nonuniformly. In contrast, if the outer diameter is in the range described above, a uniform catalyst layer can be formed. Furthermore, in order to increase the outer diameter, in some cases, it may be advantageous to stack honeycomb catalysts with an appropriate size.

If the opening is excessively small, a differential pressure and clogging may occur in the hydrolysis reaction of urea. If the opening is excessively large, when the honeycomb substrate is used for a catalyst or the like, the reactant gas may blow through the structure. As a result, sufficient catalytic performance may not be obtained, contact efficiency with urea may be decreased, and sufficient urea hydrolysis performance may not be exhibited. Note that, in the present invention, the shape of the opening is not particularly limited. The term "opening" refers to the size generally used for a circle, an ellipse, a quadrangle, etc., and corresponds to a diameter in the case of a circle, a major axis or a minor axis, or an average thereof in the case of an ellipse, the length of a side in the case of a square, and a length or a width, or an average thereof in the case of a rectangle.

Furthermore, if the wall thickness is excessively small, although depending on the material of the substrate, the strength of the honeycomb substrate decreases, which may result in deformation of the honeycomb molded body in the manufacturing process or during delivery, filling, or use. Even if the wall thickness is increased above the range, the honeycomb substrate may become very heavy and bulky, economic efficiency in terms of transportation and manufacturing efficiency may be decreased, and also the number of cells may be decreased from the standpoint of durability of the container against weight, all of which are disadvantageous.

If the length of the honeycomb substrate is small, a large amount of honeycomb catalyst is necessary, which is not efficient. Basically, use of a long honeycomb zeolite catalyst is effective in terms of reaction efficiency etc. On the other hand, if the length of the honeycomb substrate is excessively large, it may be difficult to form a zeolite catalyst layer. Even if a zeolite catalyst can be formed, the resulting layer may be nonuniform, and catalytic performance may not be fully achieved.

When a honeycomb-type conductive substrate is used, is it possible to very easily produce a honeycomb catalyst or the like having a particulate layer excellent in terms of strength, abrasion resistance, etc. disposed therein without occurrence of cracks or the like, compared with the honeycomb catalyst or the like produced by the known molding method.

The honeycomb substrate used in the present invention may have a desired shape, such as cubic, columnar, or corrugated Furthermore, the shape of the opening may be any of various shapes, such as a circle, a triangle, or a quadrangle.

Together with the honeycomb substrate composed of metal described above, it is also possible to use a conductive honeycomb substrate in which a conductive film is disposed on a ceramic, insulating honeycomb substrate composed of glass (silica), titanium oxide, cordierite, silicon carbide, or silicon nitride. For example, it is possible to use a honeycomb substrate in which a metal film, such as aluminum, tin, gold, silver, or copper, or a film composed of a conductive metal oxide, such as tin-doped indium oxide (ITO) or antimony-doped tin oxide (ATO), is disposed on an insulating substrate. However, in the case of the honeycomb substrate composed of metal, heat conduction is high, and the reaction temperature can be uniformly controlled over the entire region of the catalyst layer. Thus, the honeycomb substrate composed of metal can be preferably used. Furthermore, the substrate itself can be easily manufactured.

Netlike Support

A netlike support can be used as a substrate. A catalyst using such a netlike support may be referred to as a "membranous catalyst". The material for the netlike support is the same as that for the honeycomb substrate described above. The netlike support is conductive, and the size of the mesh (which may be referred to as the opening) is preferably 0.03 to 10 mm, and more preferably 0.1 to 5 mm. Above all, use of at least one metal or alloy selected from copper, nickel, aluminum, and stainless steel is preferable because of inexpensiveness and relatively high conductivity. In particular, a netlike support composed of stainless steel has high strength and can be used at high temperatures, which is preferable. If the size of the mesh is small, the wire is usually thin. As a result, the support may be too flexible or the strength may be insufficient. Thus, the application is limited. An excessively large size of the mesh provides an excessively large vent, which will be described below, and the urea hydrolysis performance may be insufficient.

The netlike support may be planar, or a planar netlike support may be formed into a corrugated shape, a cylindrical shape, or the like in advance. It may also be possible to form a planar netlike support into a corrugated shape, a cylindrical shape, or the like after a zeolite catalyst layer is formed on the planar netlike support. The thickness of the zeolite catalyst layer is preferably in a range of 0.1 μm to 5 mm, and more preferably in a range of 0.2 μm to 2 mm as in the honeycomb catalyst. A membranous catalyst having such a zeolite catalyst layer can be produced in the same manner as in the production of the honeycomb catalyst except that the netlike support is used instead of the honeycomb substrate.

Structure of Catalyst Layer

A zeolite catalyst layer is formed on the substrate. The thickness of the catalyst layer is preferably in a range of 0.1 μm to 5 mm, and more preferably in a range of 0.2 μm to 2 mm. If the zeolite catalyst layer is too thin, in some cases, sufficient hydrolysis performance may not be exhibited. If the zeolite catalyst layer is excessively thick, adhesion to the honeycomb substrate or the netlike support may be insufficient, or the strength, abrasion resistance, etc., of the zeolite catalyst layer may be insufficient.

The zeolite catalyst layer is preferably composed of zeolite particles and an inorganic oxide serving as a binder. The inorganic oxide is preferably derived from a peroxo compound. Examples of the peroxo compound include peroxotitanic acid, peroxoniobic acid, peroxotungstic acid, peroxomolybdic acid, and salts thereof.

Such a peroxo compound can be synthesized, for example, by reaction of an inorganic oxide or an inorganic hydroxide, such as titanium oxide, niobium oxide, tungsten oxide, or molybdenum oxide, preferably a sol or a gel thereof with hydrogen peroxide.

In addition to serving as a binder, these inorganic oxides have an effect of promoting electrophoresis of zeolite particles onto a honeycomb substrate or a netlike support or deposition of zeolite particles onto a substrate, and are highly active for urea hydrolysis reaction. Even when the amount of zeolite particles is small, sufficient activity is exhibited. Thus, it is possible to obtain a honeycomb catalyst or a membranous catalyst which is excellent in terms of strength, abrasion resistance, etc.

The content of zeolite (solid content) in the zeolite catalyst layer is preferably in a range of 50% to 99% by weight, and more preferably in a range of 70% to 98% by weight, and the content of the inorganic oxide derived from a peroxo compound or the like (solid content) is preferably in a range of 1% to 50% by weight, and more preferably in a range of 2% to 30% by weight. If the content of zeolite is low, the urea hydrolysis performance is insufficient. On the other hand, if the content of zeolite is excessively high, it is difficult to electrically migrating zeolite particles to the honeycomb substrate to perform deposition because of the small amount of the inorganic oxide in view of manufacturing process. Even when deposition can be performed, since the amount of the inorganic oxide serving as a binder is small, in some cases, the strength of the zeolite catalyst layer may be insufficient.

Furthermore, in the present invention, the zeolite catalyst layer may contain fibrous particulates together with the zeolite particles and the inorganic oxide serving as a binder. Examples of the fibrous particulates include fibrous silica, fibrous alumina, fibrous titanium oxide, and fibrous silica.alumina. The fibrous particulates have a length of 50 nm to 10 μm, preferably 100 nm to 5 μm, a diameter of 10 nm to 2 μm, preferably 20 nm to 2 μm, and an aspect ratio (length/diameter) of 5 to 1,000, preferably 10 to 500. When the size of the fibrous particulates is in the ranges described above, excellent adhesion between the resulting zeolite catalyst layer and the honeycomb substrate or the netlike support, and excellent strength, abrasion resistance, etc. are accomplished.

The zeolite catalyst layer may further contain colloid particles having an average particle diameter in a range of 2 to 300 nm, preferably in a range of 5 to 100 nm. The colloid particles are not particularly limited as long as they have electrically charged surfaces. Examples thereof include colloid particles of titanium oxide, alumina, silica, silica.alumina, and zirconia. By incorporating such colloid particles, when zeolite particles are deposited by applying a DC voltage in the manufacturing method described later, deposition of the zeolite particles tends to be promoted, the density of the resulting zeolite catalyst layer tends to improve, and strength and abrasion resistance tend to improve.

The content of such fibrous particulates and colloid particles is not particularly limited, as long as the content of zeolite (solid content) in the zeolite catalyst layer is in a range of 50% to 99% by weight and the content of the inorganic oxide derived from a peroxo compound (solid content) is in a range of 1% to 50% by weight.

The zeolite catalyst used in the present invention is produced by the method, which will be described in detail below, in which a conductive honeycomb substrate composed of metal or netlike support (conductive substrate) is immersed in a dispersion liquid including zeolite particles, and as necessary, colloid particles or a colloid precursor, a peroxo compound which is an inorganic oxide material, and fibrous particles, a DC voltage is applied to the conductive substrate and the dispersion liquid, and thereby a zeolite catalyst layer is deposited on the surface of the honeycomb substrate or netlike support (such a production method is referred to as an "electrodeposition process")

Production Method of Zeolite Catalyst

As a specific method of producing a zeolite catalyst, an example of a production method in which peroxotitanic acid is used as a peroxo compound will be described below.

First, a titanium compound is hydrolyzed to prepare a sol or gel of orthotitanic acid. A gel of orthotitanic acid can be obtained by a method in which a titanium salt, such as titanium chloride, titanium sulfate, or titanyl sulfate, is used as a titanium compound, an alkali is added to neutralize an aqueous solution of the titanium salt, and washing is performed. A sol of orthotitanic acid can be obtained by passing an aqueous solution of a titanium salt through an ion exchange resin to remove anions or by adding an acid or an alkali to an aqueous and/or organic solution of a titanium alkoxide, such as titanium tetramethoxide, titanium tetraethoxide, or titanium tetraisopropoxide, to carry out hydrolysis.

When the neutralization or hydrolysis is carried out, the pH of the titanium compound solution is preferably in a range of 7 to 13. When the pH of the titanium compound solution is in the range described above, fine particles of a sol or gel of orthotitanic acid can be obtained, thereby facilitating reaction with hydrogen peroxide, which will be described below.

Furthermore, in the neutralization or hydrolysis, the temperature is preferably in a range of 0° C. to 60° C., and more preferably in a range of 0° C. to 50° C. When the temperature in the neutralization or hydrolysis is in the range described above, fine particles of the sol or gel of orthotitanic acid can be obtained, thereby facilitating reaction with hydrogen peroxide, which will be described below. Preferably, orthotitanic acid particles in the resulting gel or sol are amorphous.

Next, hydrogen peroxide is added to the sol or gel of orthotitanic acid or a mixture thereof to dissolve orthotitanic acid to prepare an aqueous solution of peroxytitanic acid. When the aqueous solution of peroxytitanic acid is prepared, preferably, the sol or gel of orthotitanic acid or a mixture thereof is heated to about 50° C. or higher or stirred according to need.

In this case, if the orthotitanic acid concentration is excessively high, a long time is required to perform dissolution, and further, the undissolved gel may be precipitated, or the resulting aqueous solution of peroxytitanic acid may become sticky. Therefore, the $TiO_2$ concentration is preferably about 10% by weight or less, and more preferably about 5% by weight or less.

With respect to the amount of hydrogen peroxide added, if the $H_2O_2/TiO_2$ (orthotitanic acid being converted to $TiO_2$) weight ratio is 1 or more, orthotitanic acid can be completely dissolved. If the $H_2O_2/TiO_2$ weight ratio is less than 1, orthotitanic acid is not completely dissolved, and the unreacted gel or sol may remain. Furthermore, as the $H_2O_2/TiO_2$ weight ratio increases, the dissolution rate of orthotitanic acid increases, and reaction completes in a shorter time. However, even if an excessive amount of hydrogen peroxide is used, the unreacted hydrogen peroxide merely remains in the system, which is uneconomical. When the amount of hydrogen peroxide added is in the range described above, orthotitanic acid is dissolved in about 0.5 to 20 hours.

By using such a peroxo compound, zeolite is easily deposited in close contact with the substrate by the electrodeposition process whereas zeolite is not easily deposited on the substrate by zeolite alone, and moreover, a zeolite catalyst layer having excellent strength can be formed.

Zeolite Dispersion Liquid

First, a dispersion liquid is prepared by dispersing the zeolite particles described above in a dispersion medium. According to need, colloid particles and fibrous particles may be added thereto. The concentration of the zeolite dispersion liquid (total solid content) is preferably 1% to 30% by weight, and more preferably 1% to 20% by weight. When the solid content concentration is excessively low, although depending on the area of the surface of the substrate on which deposition is performed, a desired thickness may not be obtained by one process because of excessively low concentration, and repeated deposition processes may be required. When the solid content concentration is excessively high, the viscosity of the dispersion liquid is high, and the deposited zeolite particle layer may be decreased, resulting in insufficient strength and abrasion resistance. Furthermore, the concentration of zeolite (as solid content) and the concentration of peroxotitanic acid (as solid content) are determined so that the contents of zeolite and titanium oxide in the resulting zeolite catalyst layer are in the ranges described above.

As the dispersion medium, at least one selected from water, alcohols, ketones, and glycols is used. Specifically, examples of alcohols include methanol, ethanol, isopropyl alcohol, and butanol; examples of ketones include acetone; and examples of glycols include ethylene glycol and propylene glycol.

In particular, water can be preferably used. In some cases, an aqueous dispersion medium containing water and an alcohol having a relatively low boiling point, such as methanol, ethanol, isopropyl alcohol, or butanol, may be used. The aqueous dispersion medium can homogeneously disperse the zeolite particles, the peroxo compound, the fibrous particulates, and the colloid particles, and the aqueous dispersion medium is easily evaporated when a zeolite particle layer is formed on a substrate, thus being preferable.

The zeolite dispersion liquid and the aqueous solution of peroxytitanic acid are mixed to prepare a dispersion liquid.

Production of Catalyst Layer

A honeycomb substrate or a netlike support is immersed in the zeolite dispersion liquid prepared as described above, and a DC voltage is applied to the honeycomb substrate or the netlike support and the dispersion liquid. The amount of the zeolite dispersion liquid used is determined such that the zeolite catalyst layer on the honeycomb substrate or the netlike support has a desired thickness. Although depending on the types etc. of the honeycomb substrate and the netlike support, the applied voltage is preferably in a range of 0.5 to 100 V (DC), and more preferably in a range of 1 to 50 V (DC). When the applied voltage is less than 0.5 V (DC), deposition of zeolite particles may be insufficient, zeolite particles may be deposited in patches, and deposition may take a long time. When the applied voltage exceeds 100 V (DC), the deposition rate is high, but the density of the resulting zeolite catalyst layer decreases, which may result in insufficient strength and abrasion resistance. The voltage application time is set such that a desired thickness of the zeolite catalyst layer is obtained, and is about 1 to 60 minutes.

After zeolite particles are deposited, the substrate is taken out, dried, and as necessary, is subjected to heat treatment. As the drying method, a known method can be employed, and air drying can be performed. Drying is usually performed at 50° C. to 200° C. for about 0.2 to 5 hours. Heat treatment is usually performed at 200° C. to 800° C. and firing is performed at 300° C. to 600° C. for about 1 to 48 hours.

The zeolite catalyst layer thus formed has a thickness preferably in a range of 0.1 µm to 5 mm, and more preferably in a range of 0.2 µm to 2 mm.

Furthermore, after the resulting zeolite catalyst layer is dried or subjected to heat treatment, a new component may be allowed to be carried on the zeolite catalyst layer by a known method, such as an ion exchange method or an impregnation method. Examples of the new component to be carried include $V_2O_5$, $WO_3$, $Fe_2O_3$, $Re_2O_3$, $ReO_2$, $Nb_2O_5$, CuO, and NiO. The amount of the new component carried is preferably in a range of 1% to 10% by weight.

(2) Granular Molded Bodies Including Zeolite Particles

Furthermore, instead of forming a zeolite catalyst layer on a substrate, granular molded bodies may be formed directly from zeolite particles.

As the granular molded bodies, zeolite microspherical molded bodies disclosed in Japanese Unexamined Patent Application Publication No. 2004-238209, which is filed by the applicant of the present application, can be preferably used, the zeolite microspherical molded bodies being composed of a zeolite and a binder, in which (i) the average particle diameter (D) is in a range of 0.5 to 5 mm. Note that the granular molded bodies can be directly formed into a zeolite catalyst layer. Furthermore, the granular molded bodies may be formed into another shape. Note that the spherical molded bodies of the present invention do not include simple powder or pellet-shaped bodies.

In this case, the type, particle diameter, etc. of the zeolite to be used are the same as those described above. According to need, the granular molded bodies may contain colloid particles, peroxotitanic acid, and fibrous particles.

Binder

The granular molded bodies contain a binder which is present between zeolite particles and which enhances plasticity in the molding process to improve moldability and increases compressive strength and abrasion resistance of the resulting granular molded bodies.

Examples of the binder include clay minerals, such as kaoline, montmorillonite, bentonite, allophane, and sepiolite; and oxide particulates and composite oxide particulates, such as alumina, silica, zirconia, titania, silica.alumina, and silica.zirconia particulates. Such a binder preferably has a particle diameter in a range of about 10 nm to 5 μm and smaller than the particle diameter of the zeolite used. The shape of the binder is not particularly limited, and may be any of spherical, fibrous, amorphous, etc.

Furthermore, with respect to alumina, silica, silica.alumina, etc., a sol of oxide particulates or a sol of composite oxide particulates is preferably used.

In particular, a fibrous binder composed of bentonite, alumina, or the like has excellent moldability, and therefore, it is possible to obtain granular molded bodies which have a uniform particle size distribution and which is spherical and excellent in terms of strength and abrasion resistance. In particular, an alumina binder has a large pore volume and excellent abrasion resistance, and even if the alumina binder has a small particle diameter, it is possible to obtain granular molded bodies having excellent compressive strength.

The content of zeolite in the granular molded bodies is preferably in a range of 60% to 98% by weight, and more preferably in a range of 75% to 95% by weight. The content of the binder is preferably in a range of 2% to 40% by weight, and more preferably in a range of 5% to 25% by weight. When the content of zeolite in the granular molded bodies is less than the lower limit described above, the urea hydrolysis performance may be insufficient due to the small amount zeolite. When the content of zeolite in the granular molded bodies is too small, sufficient compressive strength and abrasion resistance may not be obtained due to the small amount of the binder. Therefore, disintegration into powder may occur, and in some cases, there may be a difficulty in supplying a predetermined amount of aqueous urea. When the content of the binder in the granular molded bodies is too large, sufficient compressive strength and abrasion resistance may not be obtained due to the small amount of the binder. When the content of the binder exceeds the upper limit described above, although depending on the type of binder, the effectiveness of zeolite may be inhibited due to the excessive amount of the binder.

The molding method is not particularly limited, and a known method can be employed. Examples of the molding method include, but are not limited to, a spray drying method, extrusion molding, cast molding, a doctor blade method, and a spinner method.

Among these methods, in the present invention, in particular, a spray drying method is preferably used in which, as disclosed in Japanese Unexamined Patent Application Publication No. 2004-238209, a slurry in which zeolite and a binder are dispersed is spray dried, and as necessary, the moisture content is adjusted, to obtain a mixture powder. When spray drying is performed, a zeolite and a binder are dispersed in water to prepare a slurry. In this process, the concentration of the slurry (as solid content) is preferably in a range of 1% to 40% by weight, and more preferably in a range of 2% to 35% by weight. In particular, when alumina is used as the binder, the pH of the slurry in which the zeolite and alumina particulates are dispersed is preferably in a range of 3.5 to 11.5, and more preferably in a range of 4 to 11. When the pH of the slurry in which the zeolite and alumina particulates are dispersed is low, depending on the type of zeolite, the crystallinity of the zeolite may be deterioated, or the pore volume of the resulting zeolite microspherical molded bodies, in particular, the pore volume of the zeolite microspherical molded bodies with a pore diameter of 100 to 10,000 nm is small, and as a result, the zeolite may not be sufficiently effectively used. When the pH of the slurry in which the zeolite and alumina particulates are dispersed is excessively high, the strength and abrasion resistance of the resulting zeolite microspherical molded bodies may be insufficient. The pH of the slurry in which zeolite and alumina particulates are dispersed is in the range described above, the pore volume of a pore (mesopore) having a relatively large pore diameter is large. Therefore, the performance of the zeolite can be sufficiently exhibited. In addition, in spite of the large pore volume, it is possible to obtain zeolite microspherical molded bodies having sufficient strength and abrasion resistance and a uniform particle size distribution.

The method for adjusting the pH of the slurry in which the zeolite and alumina particulates are dispersed in the range described above is not particularly limited, and the pH can be adjusted by a known method. For example, by adding an aqueous alkali solution to the slurry in which the zeolite and alumina particulates are dispersed, the pH can be adjusted. In this case, as the alkali, an aqueous ammonia solution is preferably used. It is also possible to adjust the pH by adding ammonia water to a zeolite dispersion slurry, and mixing alumina particulates or an alumina sol therewith. In the case where ammonia water is added to an alumina sol and then mixing with a zeolite slurry is performed, the alumina sol may be gelled. As a result, it may be sometimes difficult to obtain zeolite microspherical molded bodies having excellent strength and abrasion resistance.

Then, the pH-adjusted slurry in which the zeolite and alumina particulates are dispersed is spray dried. The spray drying method is not particularly limited as long as particles having an average particle diameter of 20 to 150 μm, preferably 30 to 120 μm can be obtained, and a known spray drying method can be employed.

For example, a method can be preferably used in which the slurry is sprayed using a disk or a nozzle into a hot air stream usually at 70° C. to 500° C., which although varies depending on the solid content concentration of the slurry. When the average particle diameter of the particles obtained by spray drying is too small, it is difficult to perform extrusion because the particles obtained by spray drying aggregate by the addition of the moisture when performing extrusion and the moisture content cannot be adjusted uniformly or for any other reason. In the subsequent granulation process, pellets may adhere to each other to form aggregates, and it may not be possible to obtain zeolite microspherical molded bodies with a uniform particle diameter. When the average particle diameter of the spray dried particles is too large, the pressure must be increased during extrusion molding, and the resulting zeolite microspherical molded bodies may have insufficient strength and abrasion resistance.

According to need, the mixture powder may contain a molding aid (which may also be referred to as a "plasticizer"). Examples of the molding aid include crystalline cellulose, methyl cellulose, carboxymethyl cellulose, hydroxyethyl cellulose, polyvinyl alcohol, starch, and lignin.

By adding such a molding aid, the range of moisture content in the extrusion molding process can be increased. For example, in the case of faujasite-type zeolite (Y-type zeolite), when the molding aid is not used, the range of moisture content is 46%±1.5% by weight. When crystalline cellulose as the molding aid is used in an amount of 3% by weight (solid content), even if the range of moisture content is 46%±4% by weight, moldability is good, no adhesion occurs during granulation, and it is possible to obtain zeolite microspherical molded bodies having sufficient compressive strength and abrasion resistance. Furthermore, although the reason is not clear, in the extrusion process which will be described below, pellets break such that the ratio L/D of the length (L) to the diameter (D) of the pellets is in a range of about 1 to 2. Therefore, it is possible to perform granulation without artificially cutting.

In this case, the amount of the molding aid added is preferably in a range of 0.5% to 15% by weight, and more preferably in a range of 1% to 10% by weight, on the basis of the total solid content (zeolite, binder, and pulverized powder). The moisture-adjusted mixture powder may be directly subjected to extrusion, as necessary, after addition of a molding aid, and as necessary, after kneading. It may be also possible to leave it to stand for an appropriate period of time with the moisture content being maintained and then to perform extrusion. By aging process, the strength and abrasion resistance of the resulting zeolite microspherical molded bodies may be improved.

Next, the mixture powder obtained by the process described above is extruded with an extruder to form pellet-shaped molded bodies having a diameter (D) in a range of 0.5 to 5 mm. As the extruder, a downstroke roll-type extruder having dies which discharge pellets is used. The diameter of molded bodies is controlled by the bore diameter of the dies. Pellet-shaped molded bodies having a diameter (D) of less than 0.5 mm cannot be extruded because the diameter of the dies is small. With respect to pellet-shaped molded bodies having a diameter (D) exceeding 5 mm, the particle diameter of the resulting molded bodies exceeds 5 mm, and when such large spherical molded bodies are used as a catalyst, the effectiveness factor may be degraded, and the activity may be lower than zeolite microspherical molded bodies obtained from the pellets having a diameter in the range described above.

As the extruder, a known extruder can be employed as long as the pellet diameter (D) is in the range described above, and spheroidizing can be performed in the step (c) described later. Examples of the extruder include push forward screw-type, lateral screw-type, push forward ram-type, lateral roll-type, downstroke roll-type, lateral basket-type, and downstroke screen-type extruders. In particular, a downstroke roll-type extruder can extrude mixture powder having low moisture content compared with other extruders. Therefore, in the spheroidizing process, pellets do not adhere to each other, and it is possible to obtain zeolite microspherical molded bodies having a uniform particle diameter distribution at high yield.

The length (L) of pellets, which varies depending on the bore diameter of the dies (or the diameter (D) of the resulting pellets), is in a range of 0.5 to 10 mm, and preferably in a range of 0.6 to 7.5 mm. The diameter (D) of pellets is preferably set at substantially the same value as the desired particle diameter of zeolite microspherical molded bodies. In this case, the ratio L/D of the pellet length (L) to the pellet diameter (D) is preferably in a range of 1 to 2, and more preferably in a range of 1 to 1.5. It is difficult to set the ratio L/D to less than 1, and even if it is possible, the resulting particles tend to be not spherical. When the ratio L/D exceeds 2, the resulting particles tend to be not spherical, and even if spherical particles can be obtained, spheroidizing takes a long time, which may result in a decrease in production efficiency. Although cutting can be performed such that the ratio L/D is 2 or less, there still remains a problem of a decrease in production efficiency.

As described above, since the particle diameter of the zeolite microspherical molded bodies obtained by the method of the present invention depends on the bore diameter of the dies of the extruder, the particle diameter distribution is significantly uniform.

Next, the pellets prepared in the process described above are formed into spherical molded bodies with a high-speed tumbling spheronizer. As the high-speed tumbling spheronizer, a known tumbling granulator (which may be referred to as a "marumerizer") or the like can be used. When a tumbling granulator is used, spherical particles are obtained by charging the pellets into the granulator and then rotating the granulator, or by charging the pellets into the rotating granulator. The spheroidizing conditions, such as the speed of rotation, peripheral speed, and granulation time, differ depending on the size of the spheronizer, the size of pellets charged, the degree of spheronization, etc., and are preferably set appropriately. In the present invention, since the moisture content is adjusted to a predetermined value and extrusion is performed so as to obtain a predetermined size, pellets do not adhere to each other to form aggregates, it is not necessary to perform drying or the like in order to prevent aggregation before or during the spheroidizing process, and degradation in moldability due to drying does not occur. The resulting spherical molded bodies are then dried and/or fired. The drying temperature is preferably in a range of 50° C. to 200° C., and more preferably in a range of 80° C. to 150° C. Although depending on the drying temperature, the drying time is preferably in a range of 10 minutes to 48 hours, and more preferably in a range of 30 minutes to 24 hours. When firing is performed, the temperature is preferably in a range of 200° C. to 1,000° C., and more preferably in a range of 300° C. to 800° C. When the firing temperature is lower than 200° C., the strength of the resulting particles may be insufficient, or disintegration to powder due to friction may occur notably. Even when the firing temperature exceeds 1,100° C., the strength of the particles does not further improve, and depending on the type of zeolite, crystallinity may be greatly decreased, and the function of zeolite may not be exhibited.

Second Embodiment

Catalyst Having Adhered Metal Oxide Particulates

In the second embodiment of the present invention, a honeycomb catalyst or a membranous catalyst in which metal oxide particulates adhere to the surface of a conductive honeycomb substrate or netlike support is used.

Metal Oxide Particulates

As the metal oxide particulates used in the present invention, metal oxide particulates composed of at least one element selected from the group consisting of group IA, group IIA, group IIIA, group IVA, group VA, group VIA, group VIIA, group IB, group IIB, group IIIB, group IVB, group VB, and group VIII elements is suitably used. Specific examples thereof include metal oxide particulates (including composite metal oxide particulates) composed of a metal oxide of at least one element selected from the group consisting of Na, Mg, Ca, Ba, La, Ce, Ti, Zr, V, Nb, Cr, Mo, W, Mn, Zn, Al, Si, P, Sb, Cu, Fe, Ru, Co, and Re.

In particular, preferably, the metal oxide particulates are composed of at least one selected from the group consisting of $SiO_2$, $Al_2O_3$, $TiO_2$, $ZrO_2$, NiO, $Fe_2O_3$, CoO, $RuO_2$, CuO, $Re_2O_3$, $WO_3$, $V_2O_5$, $Nb_2O_5$, and $MnO_2$. Such metal oxide particulates can be deposited onto a netlike support by application of a DC voltage, and are highly active for the urea hydrolysis reaction, thus being suitable for use.

The average particle diameter of the metal oxide particulates is preferably in a range of 10 nm to 10 μm, and more preferably in a range of 20 nm to 5 μm. If the average particle diameter of the metal oxide particulates is excessively small, when a particulate layer is formed and then dried or fired, the particulate layer shrinks drastically, cracks may be generated in the particulate layer. When the average particle diameter of the metal oxide particulates is excessively large, deposition onto the conductive substrate may be insufficient, and even if deposition can be performed, adhesion to the substrate, strength, abrasion resistance, etc. may be insufficient. Therefore, in order to use the metal oxide particulates as a catalyst for urea hydrolysis reaction used for exhaust gas treatment apparatus, the average particle diameter is desirably in the range described above.

Substrate

In the honeycomb catalyst or the membranous catalyst, a metal oxide particulate layer (catalyst layer) is disposed on the surface of a conductive honeycomb substrate or netlike support. The same substrate as that in the first embodiment is used.

Metal Oxide Particulate Layer

The thickness of the metal oxide particulate layer disposed on the substrate is preferably in a range of 0.1 μm to 5 mm, and more preferably in a range of 0.2 μm to 2 mm. If the thickness of the metal oxide particulate layer is small, catalytic performance is low, and in some cases, sufficient hydrolysis performance may not be obtained. If the thickness of the metal oxide particulate layer is excessively large, adhesion to the honeycomb substrate may be insufficient, and the strength, abrasion resistance, etc. of the metal oxide particulate layer may be insufficient. Furthermore, if the thickness is excessively large, the effect of use of a substrate composed of a metal having high heat conductivity is decreased, that is, in some cases, it may not be possible to obtain the effect of controlling the reaction temperature to a predetermined temperature uniformly over the entire region of the catalyst layer by rapidly supplying heat associated with the urea hydrolysis reaction, which is endothermic reaction.

The content of metal oxide particulates (as solid content) in the metal oxide particulate layer is preferably in a range of 50% to 99% by weight, and more preferably in a range of 70% to 98% by weight. If the content of metal oxide particulates in the metal oxide particulate layer is low, the urea hydrolysis performance is insufficient. If the content of metal oxide particulates in the metal oxide particulate layer is excessively high, since the amount of a peroxo compound is small in view of the manufacturing process described later, in some cases, the effect of electrically migrating metal oxide particulates onto the honeycomb substrate or the netlike support or the effect of depositing the metal oxide particulates may be insufficient. Even if deposition can be performed, the strength of the metal oxide particulate layer may be insufficient because of the small amount of the inorganic oxide serving as the binder. Furthermore, since the amount of fibrous particulates, which will be described later, is small, the adhesion to the honeycomb substrate, strength, abrasion resistance, etc. may be insufficient. Furthermore, since the amount of colloid particles, which will be described later, is small, the density, strength, abrasion resistance, etc. of the metal oxide particulate layer may be insufficient.

In this embodiment according to the present invention, the metal oxide particulate layer may include, together with the metal oxide particulates, fibrous particulates as in the case described above. The amount of fibrous particulates used is 20% by weight or less, and preferably 10% by weight or less, relative to the metal oxide particulates. The fibrous particles have an effect of increasing adhesion between the metal oxide particulate layer and the honeycomb substrate or the netlike support. If the amount of fibrous particles used is excessively large, since the percentage of metal oxide particulates decreases, the urea hydrolysis performance may be insufficient.

Furthermore, in this embodiment according to the present invention, the metal oxide particulate layer may include colloid particles as in the case described above. Furthermore, the metal oxide particulate layer preferably include, together with the fibrous particulates and the colloid particles, an inorganic oxide which serves as a binder. In this case, the inorganic oxide is preferably an inorganic oxide derived from a peroxo compound. Examples of the peroxo compound include peroxotitanic acid, peroxoniobic acid, peroxotungstic acid, peroxomolybdic acid, and salts thereof. The peroxo compound is the same as in the case described above.

In addition to serving as a binder, these inorganic oxides have an effect of promoting electrical migration of metal oxide particulates onto a honeycomb substrate or a netlike support or deposition of metal oxide particulates onto a substrate, and are highly active for urea hydrolysis reaction. Even when the amount of metal oxide particulates is small, sufficient activity is exhibited. Thus, it is possible to obtain a honeycomb catalyst or a membranous catalyst which is excellent in terms of strength, abrasion resistance, etc.

The content of the inorganic oxide derived from the peroxo compound (solid content) in the metal oxide particulate layer is 50% by weight or less, preferably in a range of 1% to 50% by weight, and more preferably in a range of 2% to 30% by weight.

The content of each of the fibrous particulates, the colloid particles, and the inorganic oxide is not particularly limited within the range described above as long as the content of metal oxide particulates (solid content) in the metal oxide particulate layer is in a range of 50% to 99% by weight.

Production Method

In a method for producing a honeycomb or membranous catalyst having such a metal oxide particulate layer, as in the first embodiment, a conductive metal honeycomb substrate or netlike support is immersed in a metal oxide particulate dispersion liquid which contains, as necessary, fibrous particulates, colloid particles, and a peroxo compound, and a DC voltage is applied to the conductive substrate and the dispersion liquid.

Metal Oxide Particulate Dispersion Liquid

With respect to the concentration of the metal oxide particulate dispersion liquid used for preparing the catalyst, as in the first embodiment, the concentration of the total solid including the fibrous particulates, the colloid particles, and the peroxo compound, which are used according to need, is preferably in a range of 1% to 30% by weight, and more preferably in a range of 1% to 20% by weight. The dispersion medium of the metal oxide particulate dispersion liquid is the same as in the first embodiment.

As in the first embodiment, a honeycomb substrate or a netlike support is immersed in the metal oxide particulate dispersion liquid, and a DC voltage is applied to the honeycomb substrate or the netlike support and the dispersion liquid. The amount of the metal oxide particulate dispersion liquid used is determined such that the zeolite catalyst layer on the honeycomb substrate or the netlike support has a desired thickness. Although depending on the types etc. of the honeycomb substrate and the netlike support, as in the first embodiment, the applied voltage is preferably in a range of 0.5 to 100 V (DC), and more preferably in a range of 1 to 50 V (DC). The voltage application time is set such that a desired thickness of the metal oxide particulate layer is obtained, and is about 1 to 60 minutes.

After metal oxide particulates are deposited, the substrate is taken out, dried, and as necessary, is subjected to heat treatment. As the drying method, a known method can be employed, and air drying can be performed. Drying is usually performed at 50° C. to 200° C. for about 0.2 to 5 hours. Heat treatment is usually performed at 200° C. to 800° C. and firing is performed at 300° C. to 600° C. for about 1 to 48 hours.

The metal oxide particulate layer of the honeycomb or membranous catalyst thus formed has a thickness preferably in a range of 0.1 µm to 5 mm, and more preferably in a range of 0.2 µm to 2 mm.

Furthermore, after the resulting metal oxide particulate layer is dried or subjected to heat treatment, a new component may be allowed to be carried on the metal oxide particulate layer by a known method, such as an ion exchange method or an impregnation method. Examples of the new component to be carried include $V_2O_5$, $WO_3$, $Fe_2O_3$, $Re_2O_3$, $ReO_2$, $Nb_2O_5$, CuO, and NiO. The amount of the new component carried is preferably in a range of 1% to 10% by weight.

[Exhaust Gas Treatment Apparatus]

In an exhaust gas treatment apparatus according to the present invention, a device which selectively reduces $NO_x$ in an exhaust gas is not particularly limited and is appropriately selected depending on the use conditions and scale. Usually, a denitration catalyst is charged into such a $NO_x$ selective reduction device. As the catalyst, a known catalyst can be employed without particular limitations. For example, a catalyst in which vanadium pentoxide ($V_2O_5$) is carried on a titanium oxide ($TiO_2$) carrier may be used. The denitration catalyst is preferably supported by a support having a so-called honeycomb structure. The charging amount of the denitration catalyst is adjusted to substantially correspond to the displacement.

In the present invention, a device (urea hydrolysis reactor) which decomposes urea by a charged zeolite catalyst and supplies ammonia as a $NO_x$ reducing gas is arranged to the $NO_x$ selective reduction device. The reactor has an ammonia conduit at an end thereof, the ammonia conduit extending to the upstream of the denitration catalyst charged portion in the $NO_x$ selective reduction device. As necessary, an ammonia nozzle may be provided to an end of such a conduit.

The urea hydrolysis reactor into which the zeolite catalyst is provided may have an electrical heater which maintains the zeolite catalyst at a certain temperature on the exterior thereof. The level of electrical heater is also appropriately selected depending on the use conditions and scale. The urea hydrolysis reactor may be maintained at a certain temperature by a heating means, such as an electrical heater.

In the urea hydrolysis reactor, a urea nozzle, which sprays aqueous urea fed under pressure by a pump from an aqueous urea tank, may be provided on the upstream of the zeolite catalyst charged portion so as to face the urea hydrolysis catalyst charged portion. Furthermore, in the urea hydrolysis reactor, an air supply port, which supplied air fed under pressure from a compressor through a valve, may be provided on the upstream of the urea nozzle. The pump for feeding under pressure aqueous urea and the valve for adjusting the amount of air supply are usually controlled by a control unit on the basis of data on the amount of exhaust gas, $NO_x$ concentration, and temperature.

Decomposition of Urea by Catalyst

In the present invention, the zeolite catalyst (first embodiment), or the honeycomb catalyst or membranous catalyst (second embodiment) composed of metal oxide particulates is charged in a device (B), an aqueous urea solution is supplied to the device (B) so that urea is converted by hydrolysis into ammonia and carbon dioxide, the resulting ammonia gas is supplied to a device (A) which is disposed downstream of the device (B) so that $NO_x$ is reduced to nitrogen and water, thereby purifying the exhaust gas.

The volume of the urea hydrolysis reactor or the catalyst to be charged, which depends on the type of fuel, displacement, etc. of the automobile, is generally in a range of 0.5 to 20 L. Urea is supplied as an aqueous solution (that is, "aqueous urea"). The concentration of aqueous urea is generally in a range of 10% to 50% by weight. If the concentration of aqueous urea exceeds 50% by weight, although depending on the reaction temperature, the ammonia formation rate may be decreased presumably because of a generation of high-melting-point materials. In the case where the concentration of aqueous urea is less than 10% by weight, water is in excess, which is not effective in view of water heating energy, the amount of aqueous urea to be supplied, etc.

The reaction temperature in the process of decomposing the urea is preferably in a range of 90° C. to 250° C., and more preferably in a range of 100° C. to 200° C. If the reaction temperature is too low, the ammonia formation rate decreases, and in some cases, selective reduction of $NO_x$ in the exhaust gas may be insufficient. If the reaction temperature is too high, the ammonia formation rate tends to decrease presumably because of a generation of high-melting-point materials, such as cyanuric acid, isocyanic acid, and melamine.

EXAMPLES

The present invention will be described on the basis of examples below. However, it is to be understood that the present invention is not limited thereto.

Example A1

Preparation of Aqueous Solution of Peroxotitanic Acid (1A)

An aqueous solution of titanium chloride was diluted with pure water to prepare an aqueous solution of titanium chloride having a concentration of 5% by weight in terms of $TiO_2$. The aqueous solution was added to ammonia water having a concentration of 15% by weight in which the temperature was adjusted to 5° C., and neutralization and hydrolysis were carried out. The pH after the addition of the aqueous solution of titanium chloride was 10.5. Then, the resulting gel was filtered and washed, and thereby an orthotitanic acid gel with a concentration of 9% by weight in terms of $TiO_2$ was obtained. The orthotitanic acid gel (100 g) was dispersed in 2,900 g of pure water, 800 g of aqueous hydrogen peroxide with a concentration of 35% by weight was added thereto, and heating was performed at 85° C. for 3 hours under stirring. Thereby, an aqueous solution of peroxytitanic acid (1A) was prepared. The concentration of the resulting aqueous solution of peroxotitanic acid was 0.5% by weight in terms of $TiO_2$.

Preparation of Zeolite Particle Dispersion Liquid (1A)

$NH_4$—Y-type zeolite (manufactured by JGC Catalysts &Chemicals Ltd., trade name: CZS, average particle diameter: 0.4 μm, zeolite concentration: 20% by weight) in the amount of 50 g was suspended in 283 g of pure water, and 1,000 g of the aqueous solution of peroxotitanic acid (1A) was added thereto while stirring. The dispersion liquid was stirred for 30 minutes, and then ultrasonic irradiation was performed for 20 minutes. Thereby, a zeolite particle dispersion liquid (1A) was prepared.

Preparation of Honeycomb Molded Body (1A)

The zeolite dispersion liquid (1A) (400 g) was placed in a 500-ml glass beaker. A honeycomb substrate (manufactured by Nippon Steel Corporation, outer diameter: 30 mm, length: 50 mm, wall thickness: 30 μm, opening: 600 cpsi, made of SUS) as a positive electrode and a flat plate made of SUS (the same material as the honeycomb substrate) in the size of 5 cm×5 cm as a negative electrode were inserted into the dispersion liquid. While stirring the zeolite particle dispersion liquid (1A) with a magnetic stirrer, a DC voltage device (Kikusui Electronics Corporation Model PAD35-10L) as a DC power source was connected to the positive electrode and the negative electrode using a SUS wire having a diameter of 1 mm, and a voltage of 15 V (DC) was applied for 2 minutes. The honeycomb substrate on which a zeolite particle layer was deposited was taken out, dried at 120° C. for 3 hours, and fired at 500° C. for 2 hours. Thereby, a honeycomb molded body (1A) was prepared.

With respect to the resulting honeycomb molded body (1A), the thickness of the zeolite catalyst layer, adhesion, and uniformity of the zeolite catalyst layer were evaluated. The results thereof are shown in Table 1.

The thickness of the zeolite catalyst layer, adhesion, uniformity of the zeolite catalyst layer were evaluated by the method and evaluation criteria described below.

Thickness of Zeolite Catalyst Layer

A portion of the honeycomb molded body (1A) obtained by electrodeposition was covered with an epoxy resin. The obtained integration cut into a round slice with a metal saw. The cut section was polished and photographed with a scanning electron microscope (SEM: manufactured by Hitachi, Ltd.). The thickness in the photograph was measured with vernier calipers, and the result is shown in Table 1.

Adhesion

The zeolite catalyst layer of the honeycomb molded body (1A) was rubbed by the ball of thumb.

⊙ No adhesion of catalyst powder to thumb.
○ Slight adhesion of catalyst component to thumb.
x Catalyst component peeled off when rubbed by thumb.

Uniformity of Zeolite Catalyst Layer

The uniformity of the film was visually evaluated from the SEM photograph.

⊙ Catalyst was deposited as uniform film on honeycomb substrate.
○ Part of catalyst was electrodeposited nonuniformly on honeycomb substrate.
Δ Catalyst was electrodeposited on honeycomb substrate in patches.
x Catalyst was not electrodeposited on honeycomb substrate.

Urea Hydrolysis Reaction

The honeycomb molded body (1A) was charged into a square reactor (inside diameter: 31 mm, length: 52 mm), and the temperature was controlled at 120° C., 180° C., and 220° C. Aqueous urea with a concentration of 25% by weight was supplied at a constant rate of 20 g/Hr. At each temperature, after one hour, gas was collected for 10 minutes, and ammonia was analyzed. The ammonia formation rate is shown in Table 1. With respect to the case in which the reaction temperature was controlled at 180° C., the ammonia formation rate after 24 hours is also shown in Table 1. Note that the ammonia formation rate (%) was calculated as follows: formation amount of ammonia (equivalence) for 10 minutes/ supply amount of urea (equivalence) for 10 minutes×100.

Example A2

Preparation of Zeolite Particle Dispersion Liquid (2A)

A zeolite particle dispersion liquid (2A) was prepared as in Example A1 except that 500 g of peroxotitanic acid was used.

Preparation of honeycomb molded body (2A)

A honeycomb molded body (2A) was prepared as in Example A1 except that the zeolite particle dispersion liquid (2A) was used. With respect to the resulting honeycomb molded body (2A), the thickness of the zeolite catalyst layer, adhesion, uniformity of the zeolite catalyst layer, and urea hydrolysis characteristics were evaluated, and the results thereof are shown in Table 1.

Example A3

Preparation of Zeolite Particle Dispersion Liquid (3A)

A zeolite particle dispersion liquid (3A) was prepared as in Example A1 except that 1,500 g of peroxotitanic acid was used.

Preparation of Honeycomb Molded Body (3A)

A honeycomb molded body (3A) was prepared as in Example A1 except that the zeolite particle dispersion liquid (3A) was used. With respect to the resulting honeycomb molded body (3A), the thickness of the zeolite catalyst layer, adhesion, uniformity of the zeolite catalyst layer, and urea hydrolysis characteristics were evaluated, and the results thereof are shown in Table 1.

Example A4

Preparation of Fibrous Particulates (1A)

Rutile titanium oxide powder (trade name: CR-EL, manufactured by Ishihara Sangyo Kaisha, Ltd.) (60 g) was mixed with 10 L of an aqueous NaOH solution with a concentration of 40% by weight. The titanium oxide powder-mixed aqueous alkali solution was charged into an autoclave, and hydrothermal treatment was carried out at 150° C. for 40 hours under stirring. Then, the mixture was cooled to room temperature, subjected to filtration separation, and washed with 20 L of 1 N hydrochloric acid. Then, drying was performed at 120° C. for 16 hours, and firing was performed at 500° C. Thereby, titanium oxide fibrous particulates (1A) were prepared. The length (L), diameter (D), and aspect ratio (L/D) of the fibrous particulates (1A) were measured, and the results thereof are shown in Table 1.

Preparation of Zeolite Particle Dispersion Liquid (4A)

$NH_4$—Y-type zeolite (manufactured by JGC Catalysts &Chemicals Ltd., trade name: CZS, average particle diameter: 0.4 μm, zeolite concentration: 20% by weight) in the amount of 50 g was suspended in 283 g of pure water, and 1,000 g of the aqueous solution of peroxotitanic acid (1A) prepared as in Example A1 and 2 g of the fibrous particulates (1A) were added thereto while stirring. Then, 50 g of titania sol (HPW-18NR manufactured by JGC Catalysts &Chemicals Ltd., average particle diameter: 18 nm, $TiO_2$ concentration: 10% by weight, dispersion medium: water) as colloid particles was added to the mixture. The dispersion liquid was stirred for 30 minutes, and then ultrasonic irradiation was performed for 20 minutes. Thereby, a zeolite particle dispersion liquid (4A) was prepared.

Preparation of Honeycomb Molded Body (4A)

A honeycomb molded body (4A) was prepared as in Example A1 except that the zeolite particle dispersion liquid (4A) was used. With respect to the resulting honeycomb molded body (4A), the thickness of the zeolite catalyst layer, adhesion, uniformity of the zeolite catalyst layer, and urea hydrolysis characteristics were evaluated, and the results thereof are shown in Table 1.

Example A5

Preparation of Zeolite Particle Dispersion Liquid (5A)

A zeolite particle dispersion liquid (5A) was prepared as in Example A4 except that 500 g of the aqueous solution of peroxotitanic acid (1A) was used.

Preparation of Honeycomb Molded Body (5A)

A honeycomb molded body (5A) was prepared as in Example A1 except that the zeolite particle dispersion liquid (5A) was used. With respect to the resulting honeycomb molded body (5A), the thickness of the zeolite catalyst layer, adhesion, uniformity of the zeolite catalyst layer, and urea hydrolysis characteristics were evaluated, and the results thereof are shown in Table 1.

Example A6

Preparation of zeolite particle dispersion liquid (6A)

A zeolite particle dispersion liquid (6A) was prepared as in Example A4 except that 1,500 g of the aqueous solution of peroxotitanic acid was used.

Preparation of Honeycomb Molded Body (6A)

A honeycomb molded body (6A) was prepared as in Example A1 except that the zeolite particle dispersion liquid (6A) was used. With respect to the resulting honeycomb molded body (6A), the thickness of the zeolite catalyst layer, adhesion, uniformity of the zeolite catalyst layer, and urea hydrolysis characteristics were evaluated, and the results thereof are shown in Table 1.

Example A7

Preparation of Zeolite Particle Dispersion Liquid (7A)

A zeolite particle dispersion liquid (7A) was prepared as in Example A4 except that 10 g of ZSM-5 (manufactured by JGC Catalysts &Chemicals Ltd., particle diameter: 1.0 μm) was used as the zeolite.

Preparation of Honeycomb Molded Body (7A)

A honeycomb molded body (7A) was prepared as in Example A1 except that the zeolite particle dispersion liquid (7A) was used. With respect to the resulting honeycomb molded body (7A), the thickness of the zeolite catalyst layer, adhesion, uniformity of the zeolite catalyst layer, and urea hydrolysis characteristics were evaluated, and the results thereof are shown in Table 1.

Example A8

Preparation of Membranous Molded Body (8A)

A zeolite particle dispersion liquid (1A) (1,000 g) prepared as in Example A1 was placed in a vat made of stainless steel (300 mm×80 mm×50 mm). A netlike support (made of stainless steel, opening: 177 μm, length: 250 mm, width: 50 mm) as a negative electrode and a flat plate made of stainless steel in the size of 250 mm×50 mm as a positive electrode were inserted into the dispersion liquid. While stirring the zeolite particle dispersion liquid (1A) with a magnetic stirrer, a DC voltage device (Kikusui Electronics Corporation Model PAD35-10L) as a DC power source was connected to the positive electrode and the negative electrode using a copper wire having a diameter of 1 mm, and a voltage of 20 V (DC) was applied for 5 minutes. A zeolite particle layer was thereby formed. The netlike support on which the zeolite particle layer was deposited was taken out and dried at 120° C. for 1 hour. Thereby, a membranous molded body (8A) was prepared.

With respect to the resulting membranous molded body (8A), the thickness of the zeolite catalyst layer, adhesion, uniformity of the zeolite catalyst layer, and urea hydrolysis characteristics were evaluated, and the results thereof are shown in Table 1. In the case of the membranous molded body (8A), the thickness of the zeolite catalyst layer was measured by vernier calipers, the thickness of the netlike support was subtracted therefrom, and the resulting value was considered as the thickness and is shown in Table 1.

Uniformity of Zeolite Catalyst Layer

The uniformity of the film was visually evaluated from the SEM photograph.

⊙ Metal oxide particulates formed layer with uniform thickness on netlike support.

○ Metal oxide particulates formed layer with nonuniform thickness on netlike support.

Δ Metal oxide particulates adhered to netlike support in patches.

x Metal oxide particulates hardly adhered to netlike support.

Urea Hydrolysis Reaction

The membranous molded body (8A) was cylindrically rolled and charged into a cylindrical reactor (inside diameter: 31 mm, length: 52 mm), and the temperature was controlled at 120° C., 180° C., and 220° C. Aqueous urea with a concentration of 25% by weight was supplied at a constant rate of 20 g/Hr. At each temperature, after one hour, gas was collected for 10 minutes, and ammonia was analyzed. The ammonia formation rate is shown in Table 1. With respect to the case in which the reaction temperature was controlled at 180° C., the ammonia formation rate after 24 hours is also shown in Table 1.

Example A9

Preparation of Granular Molded Bodies (9A)

A slurry having a solid content concentration of 12.7% by weight was obtained by mixing 17.6 Kg of Na-Y-type zeolite slurry (solid content concentration: 36.4% by weight) as a zeolite, 2.28 Kg of powdered alumina (Cataloid-AP manufactured by JGC Catalysts &Chemicals Ltd., solid content ($Al_2O_3$) concentration: 70.3% by weight, $CH_3COOH$ content: 10.8% by weight, moisture: 18.9% by weight) as a binder, and 43 Kg of water. Then, 465 g of ammonia water with a concentration of 15% by weight was added to the mixture to adjust the pH to 9.4. The obtained mixtuite was aged at 95° C. for 3 hours.

The aged slurry was spray dried by a spray dryer (hot air inlet temperature: 300° C. to 320° C., outlet temperature: 120° C. to 130° C.) and formed into powder. The resulting powder had an average particle diameter of 65 Mm and a moisture content of 24.5% by weight. The powder (1.32 Kg) was placed in a high-speed powder mixer (Henschel mixer manufactured by Mitsui Mining Co., Ltd., model FM-20C/I), and 0.47 kg of water in which 30 g of crystalline cellulose was dissolved in advance was added thereto. Mixing was performed thoroughly, and the moisture content was adjusted to 44.2% by weight.

The powder with adjusted moisture was molded into pellets using a downstroke roll-type extruder (Disc Pelleter manufactured by Fuji Paudal Co., Ltd., model F-5 (PV-5)/11-175). In this pelletizing process, first, extrusion was performed once using an extruder nozzle with a diameter of 3 mm, and then extrusion was performed once using a nozzle with a diameter of 1.5 mm. The length of the pellets was relatively uniform, and the average length was 1.8 mm.

The resulting pellets with a diameter of 1.5 mm were formed into spherical particles using a spheronizer (Marumerizer manufactured by Fuji Paudal Co., Ltd., model JED400). In this process, the number of rotations of the Marumerizer was 600 rpm, the external heat temperature was 60° C., and the processing time was 3.5 minutes. The resulting spherical molded body was dried at 130° C. for 24 hours, and then fired at 670° C. for 3 hours. Thereby, granular molded bodies (9A) were obtained.

The average minor axis length, average major axis length, average particle diameter, spherical factor, and compressive strength of the granular molded bodies (9A) were measured, and the average compressive strength index was determined. Furthermore, the abrasion resistance was measured, and the presence or absence of aggregate particles was observed. The compressive strength was measured by a compressive strength meter (Kiya-type harness meter manufactured by Fujiwara Scientific Company Ltd., max 5 Kg) in terms of N (newton). The abrasion resistance was measured according to the abrasion strength measurement method (JIS K1464). The average minor axis length and the average major axis length were measured with respect to 100 particles using optical microphotography, and the average particle diameter was defined as (average minor axis length+average major axis length)/2. As a result, the average minor axis length was 1.5 mm, the average major axis length was 1.9 mm, the average particle diameter was 1.7 mm, the spherical factor was 1.27, and the compressive strength was 8 N (newton). The abrasion resistance was 2.5, and no aggregate particles were observed.

Comparative Example A1

Preparation of Zeolite Particle Dispersion Liquid (R1)

$NH_4$—Y-type zeolite (trade name CZS manufactured by JGC Catalysts &Chemicals Ltd., average particle diameter: 0.4 μm, zeolite concentration: 20% by weight) (50 g) was suspended in 283 g of pure water. The dispersion liquid was stirred for 30 minutes, and then ultrasonic irradiation was performed for 20 minutes. Thereby, a zeolite particle dispersion liquid (R1) was prepared.

Preparation of Honeycomb Molded Body (R1)

A DC voltage was applied as in Example A1 except that the zeolite particle dispersion liquid (R1) was used. However, a zeolite particle layer was not formed on the substrate.

Comparative Example A2

Preparation of Zeolite Particle Dispersion Liquid (R2)

$NH_4$—Y-type zeolite (trade name CZS manufactured by JGC Catalysts &Chemicals Ltd., average particle diameter: 0.4 μM, zeolite concentration: 20% by weight) (50 g) was suspended in 283 g of pure water, and 2 g of fibrous particulates (1A) prepared as in Example A1 was added thereto while stirring. The dispersion liquid was stirred for 30 minutes, and then ultrasonic irradiation was performed for 20 minutes. Thereby, a zeolite particle dispersion liquid (R2) was prepared.

Preparation of Honeycomb Molded Body (R2)

A DC voltage was applied as in Example A1 except that the zeolite particle dispersion liquid (R2) was used. However, a zeolite particle layer was not formed on the substrate.

Comparative Example A3

Preparation of Zeolite Particle Dispersion Liquid (R3)

$NH_4$—Y-type zeolite (manufactured by JGC Catalysts &Chemicals Ltd., trade name: CZS, average particle diameter: 0.4 μm, zeolite concentration: 20% by weight) in the amount of 50 g was suspended in 283 g of pure water, and 50 g of a titania sol (HPW-18NR manufactured by JGC Catalysts &Chemicals Ltd., average particle diameter 18 nm, $TiO_2$ concentration: 10% by weight, dispersion medium: water) as colloid particles was added thereto while stirring. The dispersion liquid was stirred for 30 minutes, and then ultrasonic irradiation was performed for 20 minutes. Thereby, a zeolite particle dispersion liquid (R3) was prepared.

Preparation of Honeycomb Molded Body (R3)

A DC voltage was applied as in Example A1 except that the zeolite particle dispersion liquid (R3) was used. However, a zeolite particle layer was not formed on the substrate.

Comparative Example A4

Preparation of Pellet-Shaped Molded Bodies (R4)

A slurry having a solid content concentration of 12.7% by weight was obtained by mixing 17.6 Kg of Na-Y-type zeolite slurry (solid content concentration: 36.4% by weight) as a zeolite, 2.28 Kg of powdered alumina (Cataloid-AP manufactured by JGC Catalysts &Chemicals Ltd., solid content ($Al_2O_3$) concentration: 70.3% by weight, $CH_3COOH$ content: 10.8% by weight, moisture: 18.9% by weight) as a binder, and 43 Kg of water. Then, 465 g of ammonia water with a concentration of 15% by weight was added to the mixture to adjust the pH to 9.4, and the obtained mixture was aged at 95° C. for 3 hours.

The aged slurry was spray dried by a spray dryer (hot air inlet temperature: 300° C. to 320° C., outlet temperature: 120° C. to 130° C.) and formed into powder. The resulting powder had an average particle diameter of 65 μm and a moisture content of 24.5% by weight. The powder (1.32 Kg) was placed in a high-speed powder mixer (Henschel mixer manufactured by Mitsui Mining Co., Ltd., model FM-20C/I), and 0.47 kg of water in which 30 g of crystalline cellulose was dissolved in advance was added thereto. Mixing was performed thoroughly, and the moisture content was adjusted to 44.2% by weight.

The powder with adjusted moisture was molded into pellets using a downstroke roll-type extruder (Disc Pelleter manufactured by Fuji Paudal Co., Ltd., model F-5 (PV-S)/11-175). In this pelletizing process, first, extrusion was performed once using an extruder nozzle with a diameter of 3 mm, and then extrusion was performed once using a nozzle with a diameter of 1.5 mm. The length of the pellets was relatively uniform, and the average length was 1.8 mm.

The resulting pellets with a diameter of 1.5 mm were dried at 130° C. for 24 hours, and then fired at 670° C. for 3 hours. Thereby, pellet-shaped molded bodies (R4) were obtained. The pellet-shaped molded bodies (R4) had an average diameter of 1.5 mm and an average length of 1.7 mm.

Urea Hydrolysis Reaction

The pellet-shaped molded bodies (R4) (4.5 g) were charged into a cylindrical reactor (inside diameter: 31 mm, length: 52 mm), and the temperature was controlled at 120° C., 180° C., and 220° C. Aqueous urea with a concentration of 25% by weight was supplied at a constant rate of 20 g/Hr. At each temperature, after one hour, gas was collected for 10 minutes, and ammonia was analyzed. The ammonia formation rate is shown in Table 1. With respect to the case in which the reaction temperature was controlled at 180° C., the ammonia formation rate after 24 hours is also shown in Table 1.

Comparative Example A5

Preparation of Pellet-Shaped Molded Bodies (R5)

A titanium oxide carrier (shape: pellet, average diameter: 1.5 mm, average length 1.7 mm) (50 g) was allowed to absorb 30 g of an aqueous ammonium tungstate solution ($WO_3$ concentration: 5% by weight), followed by drying at 130° C. for 24 hours. Then, the carrier was allowed to absorb 30 g of an aqueous ammonium vanadate solution ($V_2O_5$ concentration: 5% by weight), followed by drying at 130° C. for 24 hours and firing at 500° C. for 2 hours. Thereby, pellet-shaped molded bodies (R5) were prepared.

Urea Hydrolysis Reaction

The pellet-shaped molded bodies (R5) (4.5 g) were charged into a cylindrical reactor (inside diameter: 31 mm, length: 52 mm), and the temperature was controlled at 120° C., 180° C., and 220° C. Aqueous urea with a concentration of 25% by weight was supplied at a constant rate of 20 g/Hr. At each temperature, after one hour, gas was collected for 10 minutes, and ammonia was analyzed. The ammonia formation rate is shown in Table 1. With respect to the case in which the reaction temperature was controlled at 180° C., the ammonia formation rate after 24 hours is also shown in Table 1.

Comparative Example A6

Urea Hydrolysis Reaction

A netlike support (made of stainless steel, opening: 177 μm, length: 250 mm, width: 50 mm) was cylindrically rolled and charged into a cylindrical reactor (inside diameter: 31 mm, length: 52 mm), and the temperature was controlled at 120° C., 180° C., and 220° C. Aqueous urea with a concentration of 25% by weight was supplied at a constant rate of 20 g/Hr. At each temperature, after one hour, gas was collected for 10 minutes, and ammonia was analyzed. The ammonia formation rate is shown in Table 1. With respect to the case in which the reaction temperature was controlled at 180° C., the ammonia formation rate after 24 hours is also shown in Table 1.

TABLE 1

| | Zeolite particles | | | Inorganic oxide | | Fibrous particulates | | | | Colloid particles | | |
|---|---|---|---|---|---|---|---|---|---|---|---|---|
| | Type | Average particle diameter μm | Content wt % | Type | Content wt % | Length (L) μm | Diameter (D) μm | Aspect ratio L/D | Content wt % | Type | Average particle diameter nm | Content wt % |
| Example A1 | Na—Y | 0.4 | 91.9 | Peroxotitanic acid | 8.1 | — | — | — | — | — | — | — |
| Example A2 | Na—Y | 0.4 | 95.8 | Peroxotitanic acid | 4.2 | — | — | — | — | — | — | — |
| Example A3 | Na—Y | 0.4 | 88.4 | Peroxotitanic acid | 11.6 | — | — | — | — | — | — | — |
| Example A4 | Na—Y | 0.4 | 80.6 | Peroxotitanic acid | 8.1 | 5 | 0.05 | 100 | 3.2 | titania sol | 18 | 8.1 |
| Example A5 | Na—Y | 0.4 | 84.0 | Peroxotitanic acid | 4.2 | 5 | 0.05 | 100 | 3.4 | titania sol | 18 | 8.4 |
| Example A6 | Na—Y | 0.4 | 77.5 | Peroxotitanic acid | 11.6 | 5 | 0.05 | 100 | 3.1 | titania sol | 18 | 7.8 |
| Example A7 | ZSM5 | 1.0 | 80.6 | Peroxotitanic acid | 8.1 | 5 | 0.05 | 100 | 3.2 | titania sol | 18 | 8.1 |
| Example A8 | Na—Y | 0.4 | 80.6 | Peroxotitanic acid | 8.1 | 5 | 0.05 | 100 | 3.2 | titania sol | 18 | 8.1 |
| Example A9 | Na—Y | 0.4 | 80.0 | $Al_2O_3$ binder | 20.0 | — | — | — | — | — | — | — |
| Comparative Example A1 | Na—Y | 0.4 | 100 | — | — | — | — | — | — | — | — | — |
| Comparative Example A2 | Na—Y | 0.4 | 96.2 | — | — | 5 | 0.05 | 100 | 3.8 | — | — | — |
| Comparative Example A3 | Na—Y | 0.4 | 90.9 | — | — | — | — | — | — | titania sol | 18 | 9.1 |
| Comparative Example A4 | Na—Y | 0.4 | 80.0 | $Al_2O_3$ binder | 20.0 | — | — | — | — | — | — | — |
| Comparative Example A5 | V/W/$TiO_2$ | Zeolite not used | — | — | — | — | — | — | — | — | — | — |
| Comparative Example A6 | None | | | | | Aqueous urea only | | | | | | |

| | Molded body | | | | | Urea hydrolysis characteristics Ammonia formation rate (%) | | | |
|---|---|---|---|---|---|---|---|---|---|
| | Positive electrode substrate | Shape | Thickness μm | Adhesion | Uniformity | 1 hr 120° C. | 1 hr 180° C. | 1 hr 220° C. | 24 hr 180° C. |
| Example A1 | Honeycomb substrate | Honeycomb | 20 | ⊚ | ⊚ | 96 | 100 | 100 | 100 |
| Example A2 | Honeycomb substrate | Honeycomb | 13 | ○ | ○ | 97 | 100 | 100 | 100 |
| Example A3 | Honeycomb substrate | Honeycomb | 28 | ⊚ | ⊚ | 94 | 98 | 100 | 100 |
| Example A4 | Honeycomb substrate | Honeycomb | 20 | ⊚ | ⊚ | 98 | 100 | 100 | 100 |
| Example A5 | Honeycomb substrate | Honeycomb | 15 | Δ | ○ | 98 | 100 | 100 | 100 |

TABLE 1-continued

| | | | | | | | | | | |
|---|---|---|---|---|---|---|---|---|---|---|
| Example A6 | Honeycomb substrate | Honeycomb | 30 | ◎ | ◎ | | 96 | 100 | 100 | 100 |
| Example A7 | Honeycomb substrate | Honeycomb | 20 | ○ | ◎ | | 88 | 98 | 100 | 100 |
| Example A8 | Netlike support | Membranous | 30 | ◎ | ◎ | | 98 | 100 | 100 | 100 |
| Example A9 | — | Granular | — | — | — | | 92 | 98 | 100 | 96 |
| Comparative Example A1 | Honeycomb substrate | — | | X | X | X | — | — | — | — |
| Comparative Example A2 | Honeycomb substrate | — | | X | X | X | — | — | — | — |
| Comparative Example A3 | Honeycomb substrate | — | | X | X | X | — | — | — | — |
| Comparative Example A4 | — | Pellet | — | — | — | | 80 | 92 | 98 | 90 |
| Comparative Example A5 | — | Granular | — | — | — | | 15 | 98 | 98 | 91 |
| Comparative Example A6 | Aqueous urea only | — | — | — | — | | 0 | 40 | 55 | 35 |

Example B1

Preparation of Fibrous Particulates (1B)

Rutile titanium oxide powder (trade name: CR-EL, manufactured by Ishihara Sangyo Kaisha, Ltd.) (60 g) was mixed with 10 L of an aqueous NaOH solution with a concentration of 40% by weight. The titanium oxide powder-mixed aqueous alkali solution was charged into an autoclave, and hydrothermal treatment was carried out at 150° C. for 25 hours under stirring. Then, the mixture was cooled to room temperature, subjected to filtration separation, and washed with 20 L of 1 N hydrochloric acid. Then, drying was performed at 120° C. for 16 hours, and firing was performed at 500° C. Thereby, titanium oxide fibrous particulates (1B) were prepared. The length (L), diameter (D), and aspect ratio (L/D) of the fibrous particulates (1B) were measured, and the results thereof are shown in Table 2.

Preparation of Metal Oxide Particulates (1B)

A mixed aqueous solution was prepared by dissolving 329.5 g of an aqueous zirconium chloride solution (Zirconsol manufactured by Daiichi Kigenso Kagaku Kogyo Co., Ltd., $ZrO_2$ concentration: 25.1% by weight) and 260.6 g of cobalt nitrate (manufactured by Kansai Chemicals Co., Ltd., CoO concentration: 25.77% by weight) in 3,630 g of pure water. The mixed aqueous solution was added over 10 minutes to an aqueous alkali solution, which was prepared by dissolving 129.9 g of sodium hydroxide (manufactured by Kanto Chemical Co., Inc.) in 11,000 g of pure water, while stirring at room temperature. Thereby, a mixed hydro gel of zirconium hydroxide and cobalt hydroxide was prepared. Next, the obtaining mixed hydro gel was aged at 70° C. for 2 hours, and then, the pH of the mixed hydro gel was adjusted to 7.5 to 8 using nitric acid with a concentration of 63% by weight. Then, the hydro gel was filtered, washed, dried at 120° C., and then fired at 500° C. for 2 hours thereby to obtain a block of $ZrO_2 \cdot CoO$ composite oxide.

The block of $ZrO_2 \cdot CoO$ composite oxide (100 g) was pulverized to form powder with an average particle diameter of 1.0 μm. The resulting powder was allowed to absorb an aqueous ruthenium chloride with a concentration of 5% by weight (as $RuO_2$) prepared by dissolving 3.4 g of ruthenium chloride (manufactured by Kojima Chemicals Co., Ltd.) in 12.5 g of water. Then the resulting powder was dried at 120° C. for 16 hours. Next, 100 g of the dry powder was dispersed in 1,666 g of ammonia water with a concentration of 5% by weight. The dispersion liquid was stirred for 1 hour, and then filtered and washed to remove chlorine. The filter cake was dried again at 120° C. for 16 hours. Thereby, metal oxide particulates (1B), i.e., a catalyst component for methanation, were prepared. The composition of the metal oxide particulates (1B) is shown in Table 2.

Preparation of Metal Oxide Particulate Dispersion Liquid (1B)

The metal oxide particulates (1B) (94.7 g) were dispersed in 500 g of pure water, and 29 g of titania sol (HPW-18NR manufactured by JGC Catalysts &Chemicals Ltd., average particle diameter: 13 mm, $TiO_2$ concentration: 10% by weight, dispersion medium: water) as colloid particles and 2.4 g of the fibrous particulates (1B) were added thereto under stirring. Stirring was performed for 30 minutes, and then ultrasonic irradiation was performed for 20 minutes. Thereby, a metal oxide particulate dispersion liquid (1B) was prepared.

Preparation of Honeycomb Catalyst (1b)

The metal oxide particulate dispersion liquid (1B) (400 g) was placed in a 500-ml glass beaker. A honeycomb substrate (manufactured by Nippon Steel Corporation, outer diameter: 30 mm, length: 50 mm, wall thickness: 30 μm, opening: 600 cpsi, made of SUS) as a negative electrode and a flat plate made of SUS (the same material as the honeycomb substrate) in the size of 5 cm×5 cm as a positive electrode were inserted into the dispersion liquid. While stirring the metal oxide particulate dispersion liquid (1B) with a magnetic stirrer, a DC voltage device (Kikusui Electronics Corporation Model PAD35-10L) as a DC power source was connected to the positive electrode and the negative electrode using a SUS wire having a diameter of 1 mm, and a voltage of 15 V (DC) was applied for 2 minutes. The honeycomb substrate on which a particulate layer was deposited was taken out, dried at 120° C. for 3 hours, and fired at 500° C. for 2 hours. Thereby, a honeycomb catalyst (1B) was prepared.

With respect to the resulting honeycomb catalyst (1B), the thickness of the particulate layer, adhesion, and uniformity of the particulate layer were evaluated. The results thereof are shown in Table 2. The thickness of the particulate layer, adhesion, uniformity of the particulate layer were evaluated by the method and evaluation criteria described below.

Thickness of Particulate Layer

The electrodeposited honeycomb substrate sample (1B) was covered with an epoxy resin and cut into a round slice with a metal saw. The cut section was polished and photographed with a scanning electron microscope (SEM: manufactured by Hitachi, Ltd.). The thickness in the photograph was measured with vernier calipers, and the result is shown in Table 2.

Adhesion

The catalyst layer electrodeposited on the outer surface of the honeycomb substrate was rubbed by ball of the thumb.

⊙ No adhesion of catalyst powder to thumb.

○ Slight adhesion of catalyst component to thumb.

× Catalyst component peeled off when rubbed by thumb.

Uniformity of Particulate Layer

The uniformity of the film was visually evaluated from the SEM photograph.

⊙ Catalyst was deposited as uniform film on honeycomb substrate.

○ Part of catalyst was electrodeposited nonuniformly on honeycomb substrate.

Δ Catalyst was electrodeposited on honeycomb substrate in patches.

× Catalyst was not electrodeposited on honeycomb substrate.

Urea Hydrolysis Reaction

The honeycomb molded body (1B) was charged into a square reactor (inside diameter: 31 mm, length: 52 mm), and the temperature was controlled at 150° C. and 220° C. Aqueous urea with a concentration of 25% by weight was supplied at a constant rate of 40 g/Hr. At each temperature, after one hour, gas was collected for 10 minutes, and ammonia was analyzed. The ammonia formation rate is shown in Table 2. With respect to the case in which the reaction temperature was controlled at 150° C., the ammonia formation rate after 48 hours is also shown in Table 2. Note that the ammonia formation rate (%) was calculated as follows: formation amount of ammonia (equivalence) for 10 minutes/supply amount of urea (equivalence) for 10 minutes×100.

Example B2

Preparation of Metal Oxide Particulates (2B)

As in Example B1, $ZrO_2 \cdot CoO$ composite oxide was prepared, and 100 g of the $ZrO_2 \cdot COO$ composite oxide was pulverized. Thereby, metal oxide particulates with an average particle diameter of 1.0 μm were prepared. The composition of the metal oxide particulates (2B) is shown in Table 2.

Preparation of Metal Oxide Particulate Dispersion Liquid (2B)

The metal oxide particulates (2B) (94.7 g) were dispersed in 500 g of pure water, and 29 g of titania sol (HPW-18NR manufactured by JGC Catalysts &Chemicals Ltd., average particle diameter: 18 nm, $TiO_2$ concentration: 10% by weight, dispersion medium: water) as colloid particles and 2.4 g of the fibrous particulates (1B) were added thereto under stirring. Stirring was performed for 30 minutes, and then ultrasonic irradiation was performed for 20 minutes. Thereby, a metal oxide particulate dispersion liquid (2B) was prepared.

Preparation of Honeycomb Catalyst (2B)

A honeycomb catalyst (2B) was prepared as in Example B1 except that the metal oxide particulate dispersion liquid (2B) was used. With respect to the resulting honeycomb catalyst (2B), the thickness of the particulate layer, adhesion, uniformity of the particulate layer, and urea hydrolysis characteristics were evaluated. The results thereof are shown in Table 2.

Example B3

Preparation of Honeycomb Catalyst (3B)

As in Example B2, a honeycomb catalyst (2B) was prepared. The honeycomb catalyst (2B) was immersed in 100 g of a separately prepared aqueous ammonium vanadate solution with a concentration of 5% by weight as $V_2O_5$ for 1 hour so as to adsorb ammonium vanadate. Then, the honeycomb substrate was taken out, dried at 120° C. for 3 hours, and fired at 500° C. for 2 hours. Thereby; a honeycomb catalyst (3B) was prepared. The $V_2O_5$ content is shown in Table 2. Furthermore, urea hydrolysis characteristics were evaluated, and the results thereof are shown in Table 2.

Example B4

Preparation of Honeycomb Catalyst (3B)

As in Example B2, a honeycomb catalyst (2B) was prepared. The honeycomb catalyst (21) was immersed for 1 hour in a separately prepared mixed aqueous solution of 100 g of an aqueous ammonium vanadate solution with a concentration of 5% by weight as $V_2O_5$ and 100 g of an aqueous ammonium tungstate solution with a concentration of 5% by weight as $WO_3$ so as to adsorb ammonium vanadate and ammonium tungstate.

Then, the honeycomb substrate was taken out, dried at 120° C. for 3 hours, and fired at 500° C. for 2 hours. Thereby, a honeycomb catalyst (3B) was prepared. The $V_2O_5$ content and $WO_3$ content are shown in Table 2. Furthermore, urea hydrolysis characteristics were evaluated, and the results thereof are shown in Table 2.

Example B5

Preparation of Metal Oxide Particulate Dispersion Liquid (5B)

A metal oxide particulate dispersion liquid (5B) was prepared as in Example B1 except that, instead of 29 g of the titania sol, 58 g of an aqueous solution of peroxotitanic acid with a $TiO_2$ concentration of 5% by weight was used.

Preparation of Honeycomb Catalyst (5B)

A honeycomb catalyst (5B) was prepared as in Example B1 except that the metal oxide particulate dispersion liquid (5B) was used. With respect to the resulting honeycomb catalyst (5B), the thickness of the particulate layer, adhesion, uniformity of the particulate layer, and urea hydrolysis characteristics were evaluated. The results thereof are shown in Table 2.

Example B6

Preparation of Metal Oxide Particulate Dispersion Liquid (6B)

Metal oxide particulates (1B) (100 g) prepared as in Example B1 were dispersed in 900 g of pure water. Stirring was performed for 30 minutes, and then ultrasonic irradiation was performed for 20 minutes. Thereby, a metal oxide particulate dispersion liquid (6B) was prepared.

Preparation of Membranous Catalyst (6B)

The metal oxide particulate dispersion liquid (6B) (1,000 g) was placed in a vat made of stainless steel (300 mm×80 mm×50 mm). A netlike support (made of stainless steel, opening: 177 μm, length: 250 mm width: 50 mm) as a negative electrode and a flat plate made of stainless steel in the size of 250 mm×50 mm as a positive electrode were inserted into the dispersion liquid. While stirring the metal oxide particulate dispersion liquid (6B) with a magnetic stirrer, a DC voltage device (Kikusui Electronics Corporation Model PAD35-10L) as a DC power source was connected to the positive electrode and the negative electrode using a copper wire having a diameter of 1 mm, and a voltage of 20 V (DC) was applied for 5 minutes. A metal oxide particulate layer was thereby formed. The netlike support on which the particulate layer was deposited was taken out, dried at 120° C. for 1 hour, and fired at 500° C. for 2 hours. Thereby, a membranous catalyst (6B) was prepared.

With respect to the resulting membranous catalyst (6B), the thickness of the metal oxide particulate layer, adhesion, uniformity of the metal oxide particulate layer, and urea hydrolysis characteristics were evaluated, and the results thereof are shown in Table 2. In the case of the membranous catalyst (6B), the thickness of the zeolite catalyst layer was measured by vernier calipers, the thickness of the netlike support was subtracted therefrom, and the resulting value was considered as the thickness and is shown in Table 2.

Uniformity of Zeolite Catalyst Layer

The uniformity of the film was visually evaluated from the SEM photograph.

⊙ Metal oxide particulates formed layer with uniform thickness on netlike support.

○ Metal oxide particulates formed layer with nonuniform thickness on netlike support.

Δ Metal oxide particulates adhered to netlike support in patches.

x Metal oxide particulates hardly adhered to netlike support.

Urea Hydrolysis Reaction

The membranous catalyst (6B) was cylindrically rolled and charged into a cylindrical reactor (inside diameter: 31 mm, length: 52 mm), and the temperature was controlled at 120° C., 180° C., and 220° C. Aqueous urea with a concentration of 25% by weight was supplied at a constant rate of 40 g/Hr. At each temperature, after one hour, gas was collected for 10 minutes, and ammonia was analyzed. The ammonia formation rate is shown in Table 2. With respect to the case in which the reaction temperature was controlled at 180° C., the ammonia formation rate after 24 hours is also shown in Table 2.

Example B7

Preparation of Metal Oxide Particulate Dispersion Liquid (7B)

Metal oxide particulates (1B) (94.7 g) prepared as in Example B1 were dispersed in 900 g of pure water, and 58 g of an aqueous solution of peroxotitanic acid with a $TiO_2$ concentration of 5% by weight and 2.4 g of fibrous particulates (1B) were added thereto under stirring. Stirring was performed for 30 minutes, and then ultrasonic irradiation was performed for 20 minutes. Thereby, a metal oxide particulate dispersion liquid (7B) was prepared.

Preparation of Membranous Catalyst (7B)

A membranous catalyst (7B) was prepared as in Example Be except that the metal oxide particulate dispersion liquid (7B) was used. With respect to the resulting membranous catalyst (7B), the thickness of the metal oxide particulate layer, adhesion, uniformity of the metal oxide particulate layer, and urea hydrolysis characteristics were evaluated, and the results thereof are shown in Table 2.

Example B8

Preparation of Membranous Catalyst (8B)

As in Example B7, a membranous catalyst (7B) was prepared. The membranous catalyst (7B) was immersed for 1 hour in a separately prepared mixed aqueous solution of 100 g of an aqueous ammonium vanadate solution with a concentration of 5% by weight as $V_2O_5$ and 100 g of an aqueous ammonium tungstate solution with a concentration of 5% by weight as $WO_3$ so as to adsorb ammonium vanadate and ammonium tungstate. Then, the membranous catalyst (7B) was taken out, dried at 120° C. for 3 hours, and fired at 500° C. for 2 hours. Thereby, a membranous catalyst (8B) was prepared. The $V_2O_5$ content and $WO_3$ content are shown in Table 2. Furthermore, urea hydrolysis characteristics were evaluated, and the results thereof are shown in Table 2.

Example B9

Preparation of Metal Oxide Particulate Dispersion Liquid (9B)

As in Example B2, a metal oxide particulate dispersion liquid (2B) was prepared.

Preparation of Membranous Catalyst (9B)

The metal oxide particulate dispersion liquid (2B) (1,000 g) was placed in a vat made of stainless steel (300 mm×80 mm×50 mm). A netlike support (made of stainless steel, opening: 177 μm, length: 250 mm, width: 50 mm) as a negative electrode and a flat plate made of stainless steel in the size of 250 mm×50 mm as a positive electrode were inserted into the dispersion liquid. While stirring the metal oxide particulate dispersion liquid (2B) with a magnetic stirrer, a DC voltage device (Kikusui Electronics Corporation Model PAD35-10L) as a DC power source was connected to the positive electrode and the negative electrode using a copper wire having a diameter of 1 mm, and a voltage of 20 V (DC) was applied for 5 minutes. A metal oxide particulate layer was thereby formed. The netlike support on which the particulate layer was deposited was taken out, dried at 120° C. for 1 hour, and fired at 500° C. for 2 hours. Thereby, a membranous molded body was prepared.

The membranous molded body was immersed for 1 hour in a separately prepared mixed aqueous solution of 100 g of an aqueous ammonium vanadate solution with a concentration of 5% by weight as $V_2O_5$ and 100 g of an aqueous ammonium tungstate solution with a concentration of 5% by weight as $WO_3$ so as to adsorb ammonium vanadate and ammonium tungstate.

Then, the membranous molded body was taken out, dried at 120° C. for 3 hours, and fired at 500° C. for 2 hours. Thereby, a membranous catalyst (9B) was prepared. The $V_2O_5$ content and $WO_3$ content are shown in Table 2. Furthermore, urea hydrolysis characteristics were evaluated, and the results thereof are shown in Table 2.

Comparative Example B1

Preparation of Pellet-Shaped Catalyst (R1)

A slurry having a solid content concentration of 12.7% by weight was obtained by mixing 1,280 g of a $ZrO_2$.CoO composite oxide having an average particle diameter of 1.4 μm prepared as in Example B1, 2,240 g of water, and as a binder, 455.2 g of powdered alumina (Cataloid-AP manufactured by JGC Catalysts &Chemicals Ltd., solid content ($Al_2O_3$) concentration: 70.3% by weight, $CH_3COH$ content: 10.8% by weight, moisture: 18.9% by weight) and 8.6 Kg of water. Then, 46.5 g of ammonia water with a concentration of 15% by weight was added to the mixture to adjust the pH to 9.4. The obtained mixture was aged at 95° C. for 3 hours. The aged slurry was spray dried by a spray dryer (hot air inlet temperature: 300° C. to 320° C., outlet temperature: 120° C. to 130° C.) and formed into powder. The resulting powder had an average particle diameter of 65 μm and a moisture content of 24.5% by weight. The powder (1.32 Kg) was placed in a high-speed powder mixer (Henschel mixer manufactured by Mitsui Mining Co., Ltd., model FM-20C/I), and 0.47 kg of water in which 30 g of crystalline cellulose was dissolved in advance was added thereto. Mixing was performed thoroughly, and the moisture was adjusted to 44.2% by weight.

The powder with adjusted moisture was molded into pellets using a downstroke roll-type extruder (Disc Pelleter manufactured by Fuji Paudal Co., Ltd., model F-5 (PV-S)/11-175). In this pelletizing process, first, extrusion was performed using an extruder nozzle with a diameter of 3 mm, and cutting was performed with a length of about 5 mm. The resulting pellets were dried at 130° C. for 24 hours, and then fired at 500° C. for 2 hours. Thereby, a pellet-shaped catalyst (R1) was obtained. The pellet-shaped catalyst (R1) had an average diameter of 3.0 mm and an average length of 4.8 mm. The composition of the pellet-shaped catalyst (R1) was as follows: $ZrO_2$: 44.2% by weight, CoO: 35.8% by weight, and $Al_2O_3$: 20% by weight.

Urea Hydrolysis Reaction

Urea hydrolysis reaction was carried out as in Example B6 except that 4.5 g of the pellet-shaped catalyst (R1) was charged into a cylindrical reactor (inside diameter: 31 mm, length: 52 mm), and the results are shown in Table 2.

Comparative Example B2

Preparation of Pellet-Shaped Catalyst (R2)

A pellet-shaped catalyst (R1) was prepared as in Comparative Example B1. The pellet-shaped catalyst (R1) was immersed for 1 hour in a separately prepared mixed aqueous solution of 100 g of an aqueous ammonium vanadate solution with a concentration of 5% by weight as $V_2O_5$ and 100 g of an aqueous ammonium tungstate solution with a concentration of 5% by weight as $WO_3$ so as to adsorb ammonium vanadate and ammonium tungstate.

Then, the pellet-shaped catalyst (R1) was taken out, dried at 120° C. for 3 hours, and fired at 500° C. for 2 hours. Thereby, a pellet-shaped catalyst (R2) was prepared. The pellet-shaped catalyst (R2) had an average diameter of 3.0 mm and an average length of 4.8 mm. The composition of the pellet-shaped catalyst (R2) was as follows: $ZrO_2$: 40.1% by weight, CoO: 32.5% by weight, $Al_2O_3$: 18.2% by weight, $V_2O_5$: 4.6% by weight, and $WO_3$: 4.6% by weight.

Urea Hydrolysis Reaction

Urea hydrolysis reaction was carried out as in Example B6 except that 4.5 g of the pellet-shaped catalyst (R2) was charged into a cylindrical reactor (inside diameter: 31 mm, length: 52 mm), and the results are shown in Table 2.

Comparative Example B3

Preparation of Pellet-Shaped Catalyst (R3)

A titanium oxide carrier (shape: pellet, average diameter: 1.5 mm, average length 1.7 mm) (50 g) was allowed to absorb 30 g of an aqueous ammonium tungstate solution ($WO_3$ concentration: 5% by weight), followed by drying at 130° C. for 24 hours. Then, the carrier was allowed to absorb 30 g of an aqueous ammonium vanadate solution ($V_2O_5$ concentration: 5% by weight), followed by drying at 130° C. for 24 hours and firing at 500° C. for 2 hours. Thereby, a pellet-shaped catalyst (R3) was prepared. The composition of the pellet-shaped catalyst (R3) was as follows: $TiO_2$: 94.3% by weight, $V_2O_5$: 2.8% by weight, and $WO_3$: 2.8% by weight.

Urea Hydrolysis Reaction

Urea hydrolysis reaction was carried out as in Example B6 except that 4.5 g of the pellet-shaped catalyst (R3) was charged into a cylindrical reactor (inside diameter: 31 mm, length: 52 mm), and the results are shown in Table 2.

Comparative Example B4

Urea Hydrolysis Reaction

A netlike support (made of stainless steel, opening: 177 μm, length: 250 mm, width: 50 mm, a catalyst layer not formed) was cylindrically rolled and charged into a cylindrical reactor (inside diameter: 31 mm, length: 52 mm), and the temperature was controlled at 150° C. and 220° C. Aqueous urea with a concentration of 25% by weight was supplied at a constant rate of 40 g/Hr. At each temperature, after one hour, gas was collected for 10 minutes, and ammonia was analyzed. The ammonia formation rate is shown in Table 2. With respect to the case in which the reaction temperature was controlled at 220° C., the ammonia formation rate after 48 hours is also shown in Table 2.

TABLE 2

| | | Catalyst | | | | | | | | | |
|---|---|---|---|---|---|---|---|---|---|---|---|
| | | Metal oxide particulates | | | | | Fibrous particulates | | | | Colloid particles | | |
| | | Metal oxide | | | | Average particle diameter | Length | Diameter | Aspect ratio | Content | | Average particle diameter | Content |
| | Substrate | $ZrO_2$ wt % | CoO wt % | RuO wt % | Content wt % | μm | (L) μm | (D) μm | L/D | wt % | Type | nm | wt % |
| Example B1 | Honeycomb substrate | 49.6 | 40.1 | 5.0 | 94.7 | 1.0 | 3 | 0.05 | 60 | 2.4 | TiO2 | 18 | 2.9 |
| Example B2 | Honeycomb substrate | 52.4 | 42.3 | — | 94.7 | 1.0 | 3 | 0.05 | 60 | 2.4 | $TiO_2$ | 18 | 2.9 |
| Example B3 | Honeycomb substrate | 49.8 | 40.4 | — | 90.2 | 1.0 | 3 | 0.05 | 60 | 2.2 | TiO2 | 18 | 2.8 |
| Example B4 | Honeycomb substrate | 47.6 | 38.6 | — | 86.2 | 1.0 | 3 | 0.05 | 60 | 2.2 | $TiO_2$ | 18 | 2.6 |
| Example B5 | Honeycomb substrate | 49.6 | 40.1 | 5.0 | 94.7 | 1.0 | 3 | 0.05 | 60 | 2.4 | — | — | — |
| Example B6 | Netlike support | 55.3 | 44.7 | 5.0 | 100 | 1.0 | — | — | — | — | — | — | — |
| Example B7 | Netlike support | 49.6 | 40.1 | 5.0 | 94.7 | 1.0 | 3 | 0.05 | 60 | 2.4 | — | — | — |
| Example B8 | Netlike support | 49.6 | 40.1 | 5.0 | 94.7 | 1.0 | 3 | 0.05 | 60 | 2.4 | — | — | — |

TABLE 2-continued

| | | | | | | | | | | | | | |
|---|---|---|---|---|---|---|---|---|---|---|---|---|---|
| Example B9 | Netlike support | 52.4 | 42.3 | — | 94.7 | 1.0 | 3 | 0.05 | 60 | 2.2 | TiO2 | 1.8 | 2.6 |
| Comparative Example B1 | | colspan="12" | Pellet-shaped catalyst ZrO2: 44.2 wt %, CoO: 35.8 wt %, Al2O3: 20 wt % |
| Comparative Example B2 | | colspan="12" | Pellet-shaped catalyst Zro₂: 40.1 wt %, CoO: 32.5 wt %, Al₂O₃: 18.5 wt %, V₂O₅: 4.6 wt %, WO₃: 4.6 wt % ○ |
| Comparative Example B3 | | colspan="12" | Pellet-shaped catalyst TiO₂: 94.3 wt %, V₂O₅: 2.8 wt %, WO₃: 2.6 wt % |
| Comparative Example B4 | Netlike support | colspan="12" | No catalyst layer formed |

| | Catalyst | | | | | | | | | Urea hydrolysis characteristics Ammonia formation rate (%) | | |
|---|---|---|---|---|---|---|---|---|---|---|---|---|
| | Inorganic oxide | Oxide carried | | | | | Particulate layer | | | | | |
| | | TiO₂ | V₂O₅ | WO₃ | Applied voltage | | | | | | | |
| | | Con-tent | Con-tent | Con-tent | | | Thick-ness | | | 1 hr | | 48 hr |
| | Type | wt % | wt % | wt % | Solvent Type | Voltage V | Time Min | (m | Adhe-sion | Uni-formity | 150° C. | 220° C. | 220° C. |
| Example B1 | — | — | — | — | Water | 15 | 2 | 20 | ◎ | ◎ | 95 | 100 | 100 |
| Example B2 | — | — | — | — | Water | 15 | 2 | 20 | ◎ | ◎ | 93 | 100 | 100 |
| Example B3 | — | — | — | 4.8 | Water | 15 | 2 | 20 | ◎ | ◎ | 100 | 100 | 100 |
| Example B4 | — | — | 4.5 | 4.5 | Water | 15 | 2 | 20 | ◎ | ◎ | 100 | 100 | 100 |
| Example B5 | Peroxotitanic acid | 2.9 | — | — | Water | 15 | 2 | 20 | ◎ | ◎ | 100 | 100 | 100 |
| Example B6 | — | — | — | — | Water | 15 | 2 | 30 | ◎ | ◎ | 85 | 98 | 96 |
| Example B7 | Peroxotitanic acid | 2.9 | — | — | Water | 15 | 2 | 30 | ◎ | ◎ | 100 | 100 | 100 |
| Example B8 | Peroxotitanic acid | 2.9 | 4.5 | 4.5 | Water | 15 | 2 | 30 | ◎ | ◎ | 100 | 100 | 100 |
| Example B9 | — | — | 4.5 | 4.5 | Water | 15 | 2 | 30 | ◎ | ◎ | 100 | 100 | 100 |
| Comparative Example B1 | colspan="11" | Pellet-shaped catalyst ZrO2: 44.2 wt %, CoO: 35.8 wt %, Al2O3: 20 wt % | 40 | 80 | 75 |
| Comparative Example B2 | colspan="11" | Pellet-shaped catalyst Zro₂: 40.1 wt %, CoO: 32.5 wt %, Al₂O₃: 18.5 wt %, V₂O₅: 4.6 wt %, WO₃: 4.6 wt % ○ | 50 | 90 | 85 |
| Comparative Example B3 | colspan="11" | Pellet-shaped catalyst TiO₂: 94.3 wt %, V₂O₅: 2.8 wt %, WO₃: 2.6 wt % | 55 | 95 | 88 |
| Comparative Example B4 | colspan="11" | No catalyst layer formed | 35 | 50 | 30 |

The invention claimed is:

1. An exhaust gas treatment apparatus comprising:
a device (A) which is provided in an exhaust system and which selectively reduces $NO_x$ in an exhaust gas; and
a device (B) which is disposed upstream of the device (A) and which decomposes urea and supplies ammonia as a $NO_x$ reducing gas,
wherein the device (B) includes a urea decomposition catalyst,
the urea decomposition catalyst is a zeolite catalyst which is composed of granular molded bodies including zeolite particles or which includes a catalyst layer composed of a support and zeolite particles disposed on the support,
wherein the average particle diameter of the zeolite particles is in a range of 0.01 to 10 μm, and
the catalyst layer contains an inorganic oxide binder.

2. The exhaust gas treatment apparatus according to claim 1, wherein a zeolite used in the zeolite catalyst is at least one selected from ZSM-5-type zeolite, mordenite-type zeolite, faujasite-type zeolite, A-type zeolite, L-type zeolite, and β zeolite.

3. The exhaust gas treatment apparatus according to claim 2, wherein the average particle diameter of the zeolite particles is in a range of 0.01 to 10 μm.

4. An exhaust gas treatment apparatus comprising:
a device (A) which is provided in an exhaust system and which selectively reduces $NO_x$ in an exhaust gas; and
a device (B) which is disposed upstream of the device (A) and which decomposes urea and supplies ammonia as a $NO_x$ reducing gas,
wherein the device (B) includes a urea decomposition catalyst,
the urea decomposition catalyst is a honeycomb catalyst or a membranous catalyst in which metal oxide particulates adhere to a conductive honeycomb substrate or netlike support, and
the metal oxide particulates are composed of at least one oxide of a metal selected from the group consisting of Na, Mg, Ca, Ba, La, Ce, Ti, Zr, V, Cr, Mo, W, Mn, Zn, Al, Si, P, Sb, Cu, Fe, Ru, Co, and Re,
wherein the urea decomposition catalyst further includes, together with the metal oxide particulates, a fibrous material having a length (L) of 50 nm to 10 μm, a diameter (D) of 10 nm to 2 μm, and an aspect ratio (L)/(D) of 5 to 1,000.

5. The exhaust gas treatment apparatus according to claim 4, wherein the metal oxide particulates are composed of at least one selected from $SiO_2$, $Al_2O_3$, $TiO_2$, $ZrO_2$, NiO, $Fe_2O_3$, CoO, $RuO_2$, CuO, $Re_2O_3$, $WO_3$, $V_2O_5$, $Nb_2O_5$, and $MnO_2$.

6. The exhaust gas treatment apparatus according to claim 5, wherein the average particle diameter of the metal oxide particulates is in a range of 10 nm to 10 μm.

7. The exhaust gas treatment apparatus according to claim 4, wherein the average particle diameter of the metal oxide particulates is in a range of 10 nm to 10 μm.

8. The exhaust gas treatment apparatus according to claim 1, wherein the urea decomposition catalyst further includes, together with the zeolite particles or the metal oxide particulates, a fibrous material having a length (L) of 50 nm to 10 μm, a diameter (D) of 10 nm to 2 μm, and an aspect ratio (L)/(D) of 5 to 1,000.

9. The exhaust gas treatment apparatus according to claim 1, wherein the urea decomposition catalyst further includes, together with the zeolite particles or the metal oxide particulates, colloid particles having an average particle diameter in a range of 2 to 300 nm.

10. The exhaust gas treatment apparatus according to claim 1, wherein the urea decomposition catalyst further includes, together with the zeolite particles or the metal oxide particulates, an inorganic oxide derived from a peroxo compound.

11. The exhaust gas treatment apparatus according to claim 1, wherein the urea decomposition catalyst is formed by an electrodeposition process.

12. The exhaust gas treatment apparatus according to claim 1, wherein the reaction temperature during the decomposition of the urea is in a range of 90° C. to 250° C.

13. The exhaust gas treatment apparatus according to claim 4, wherein the urea decomposition catalyst further includes, together with the zeolite particles or the metal oxide particulates, colloid particles having an average particle diameter in a range of 2 to 300 nm.

14. The exhaust gas treatment apparatus according to claim 4, wherein the urea decomposition catalyst further includes, together with the zeolite particles or the metal oxide particulates, an inorganic oxide derived from a peroxo compound.

15. The exhaust gas treatment apparatus according to claim 4, wherein the urea decomposition catalyst is formed by an electrodeposition process.

16. The exhaust gas treatment apparatus according to claim 4, wherein the reaction temperature during the decomposition of the urea is in a range of 90° C. to 250° C.

* * * * *